United States Patent
Kuma et al.

[11] Patent Number: 6,055,824
[45] Date of Patent: *May 2, 2000

[54] METHOD AND DEVICE FOR REFRIGERATING A FLUID

[75] Inventors: Toshimi Kuma, Fukuoka; Tsutomu Hirose, Kumamoto; Yukito Kawakami, Fukuoka, all of Japan

[73] Assignee: Kabushiki Gaisha Seibu Giken, Fukuoka, Japan

[ * ] Notice: This patent is subject to a terminal disclaimer.

[21] Appl. No.: 09/303,913

[22] Filed: May 3, 1999

Related U.S. Application Data

[63] Continuation of application No. 08/744,992, Nov. 7, 1996, Pat. No. 5,775,121.

[30] Foreign Application Priority Data

Nov. 7, 1995 [JP] Japan ..................................... 7-323486
Jun. 21, 1996 [JP] Japan ..................................... 8-181484

[51] Int. Cl.⁷ ..................................................... F28D 5/00
[52] U.S. Cl. ................................................. 62/314; 62/121
[58] Field of Search .............................. 62/314, 121, 91, 62/92, 95, 96, 304, 309, 310, 171

[56] References Cited

U.S. PATENT DOCUMENTS

| | | |
|---|---|---|
| 4,002,040 | 1/1977 | Munters et al. . |
| 4,429,735 | 2/1984 | Nomaguchi et al. . |
| 4,552,303 | 11/1985 | Fisher et al. . |
| 4,660,390 | 4/1987 | Worthington . |
| 4,713,943 | 12/1987 | Wainwright ................................. 62/304 |
| 4,793,152 | 12/1988 | Naderi . |
| 4,901,919 | 2/1990 | Wainwright ................................. 237/81 |
| 4,910,971 | 3/1990 | McNab . |
| 5,315,843 | 5/1994 | Morozov et al. . |
| 5,353,606 | 10/1994 | Yoho et al. . |
| 5,580,370 | 12/1996 | Kuma et al. . |
| 5,775,121 | 7/1998 | Kuma et al. ................................. 62/314 |

FOREIGN PATENT DOCUMENTS

| | | |
|---|---|---|
| 4313976 A1 | 11/1993 | Germany . |
| 41-9672 | 5/1941 | Japan . |
| 56-32759 | 8/1981 | Japan . |
| 57-47632 | 10/1982 | Japan . |
| 61-225593 | 10/1986 | Japan . |
| 7-96899 | 4/1995 | Japan . |
| 2215833 | 9/1989 | United Kingdom . |
| 2215833A | 9/1989 | United Kingdom . |
| 93010404 | 5/1993 | WIPO . |

Primary Examiner—William Doerrler
Attorney, Agent, or Firm—Staas & Halsey, LLP

[57] ABSTRACT

A method and device refrigerate a fluid by adding a volatile liquid mist to a flow of a gas to saturate the gas with vapor of the volatile liquid, to cause a large amount of misty minute liquid drops of the volatile liquid to float in the gas and to form a cooling gas. The cooling gas is directed through a first flow passage of a heat exchanger having first and second flow passages. The fluid to be refrigerated is directed through the second flow passage of the heat exchanger, so that heat from the fluid is transferred to the cooling gas, while the cooling gas passes through the first flow passage of the heat exchanger to elevate the temperature of the cooling gas. A portion of the minute liquid drops floating in the cooling gas are allowed to vaporize due to the elevated temperature of the cooling gas. The temperature of the cooling gas is continuously lowered by the heat of vaporization of the vaporizing minute liquid drops. The fluid passing through the heat exchanger is thus continuously refrigerated with the cooling gas having the continuously lowered temperature.

36 Claims, 18 Drawing Sheets

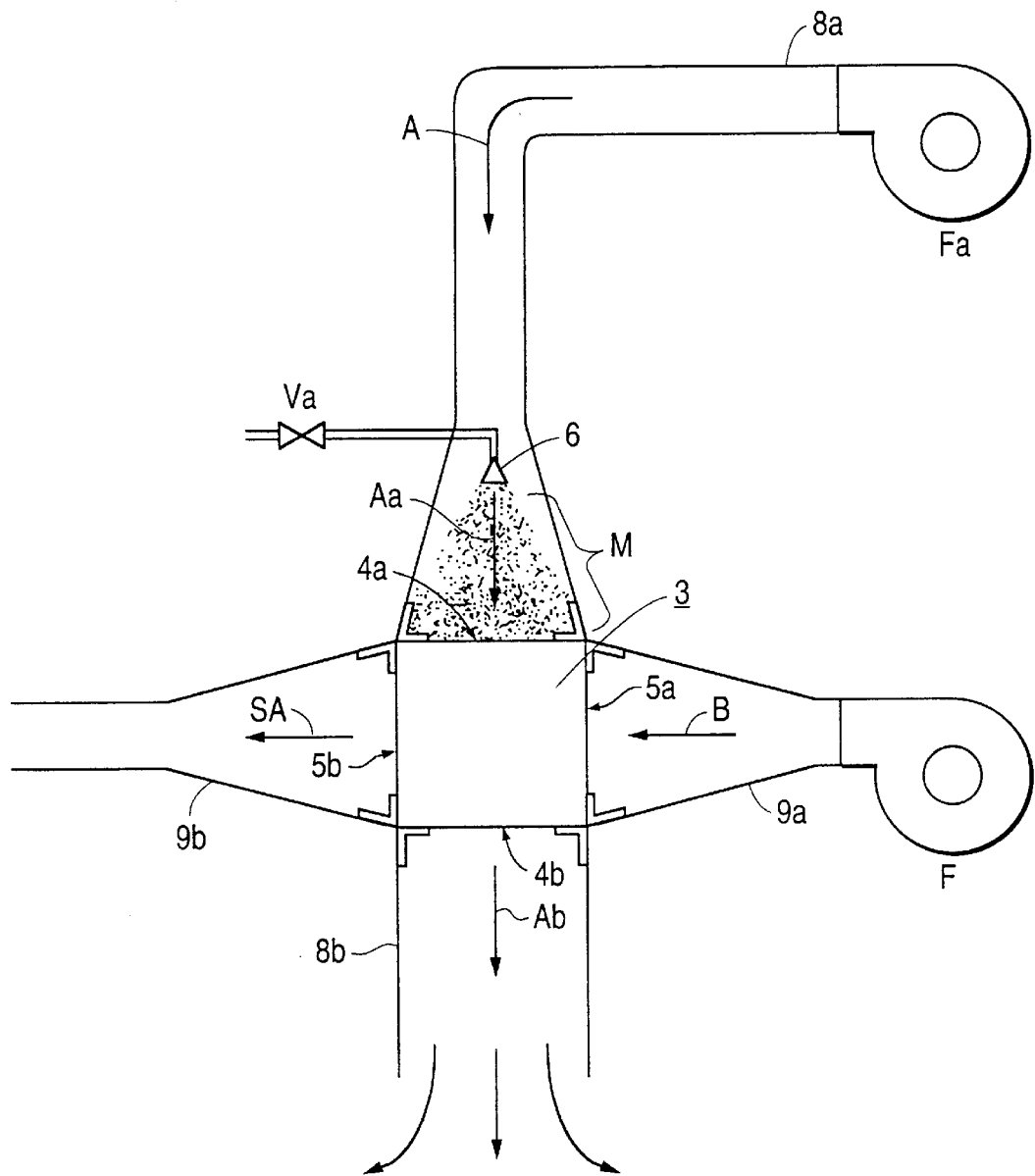

METHOD AND DEVICE FOR REFRIGERATING A FLUID

This application is a continuation of application Ser. No. 08/744,992, filed Nov. 7, 1996, now U.S. Pat. No. 5,775,121.

BACKGROUND OF THE INVENTION

1. Field of the Invention

The present invention relates to a method and a device for refrigerating fluid by heat exchange between fluids such as between two gases or between a liquid and a gas, and, more specifically, to a method and device for desiccative refrigeration of gas such as air.

2. Description of the Related Art

For refrigerating fluids, such as air, or liquid, a refrigerator which performs refrigeration utilizing the heat of vaporization of a chlorofluoro hydrocarbon is commonly used. Such chlorofluoro hydrocarbons are sold by DuPont under the tradename FREON. Hereinafter, the tradename "Freon" is used to refer to chlorofluoro hydrocarbons. In refrigerators of this type, Freon, which has been liquidized with a compressor, is evaporated. In such a refrigerator, a cooling tower for emitting compression heat of the Freon gas emits heat by passing the Freon gas through a spiral pipe on which water flows downward. Vaporization of the water flowing on the pipe may be increased with Freon flowing in a counter current direction to the water.

It is requested in general air conditioning to obtain air of comfortable temperature and humidity. To achieve these goals, internal air may be recirculated or external air may be introduced, either of which is processed to lower both temperature and humidity. As Freon gas is compressed by a compressor in air conditioning, energy consumption is large and also destruction of the ozone layer of the atmosphere by Freon is a serious matter. A large amount of energy is also consumed in the cooling tower.

BRIEF SUMMARY OF THE INVENTION

Accordingly, it is an object of the present invention is to provide a method and a device for refrigeration of fluids such as gas, like air, and liquid using a heat exchanger, which does not require Freon.

It is a further object of the present invention to continuously supply air of comfortable temperature and humidity or gas of low temperature and low humidity using desiccative refrigeration.

It is a still further object of the present invention to refrigerate using less energy than used in conventional methods/devices.

To accomplish these and other objects, a method and device for refrigerating a fluid are provided in which a volatile liquid mist is added through a nozzle to a flow of a gas to saturate the gas with vapor of the volatile liquid, to cause a large amount of misty minute liquid drops of the volatile liquid to float in the gas and to form a cooling gas. The cooling gas is directed through a first flow passage of a heat exchanger having first and second flow passages. The fluid to be refrigerated is directed through the second flow passage of the heat exchanger, so that heat from the fluid is transferred to the cooling gas, while the cooling gas passes through the first flow passage of the heat exchanger to elevate the temperature of the cooling gas. A portion of the minute liquid drops floating in the cooling gas are allowed to vaporize due to the elevated temperature of the cooling gas. The temperature of the cooling gas is continuously lowered by the heat of vaporization of the vaporizing minute liquid drops. The fluid passing through the heat exchanger is thus continuously refrigerated with the cooling gas having the continuously lowered temperature.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 3 is a cross-sectional side view showing another example of a method and device for fluid refrigeration of the present invention;

DETAILED DESCRIPTION OF THE INVENTION

Figure 1A:
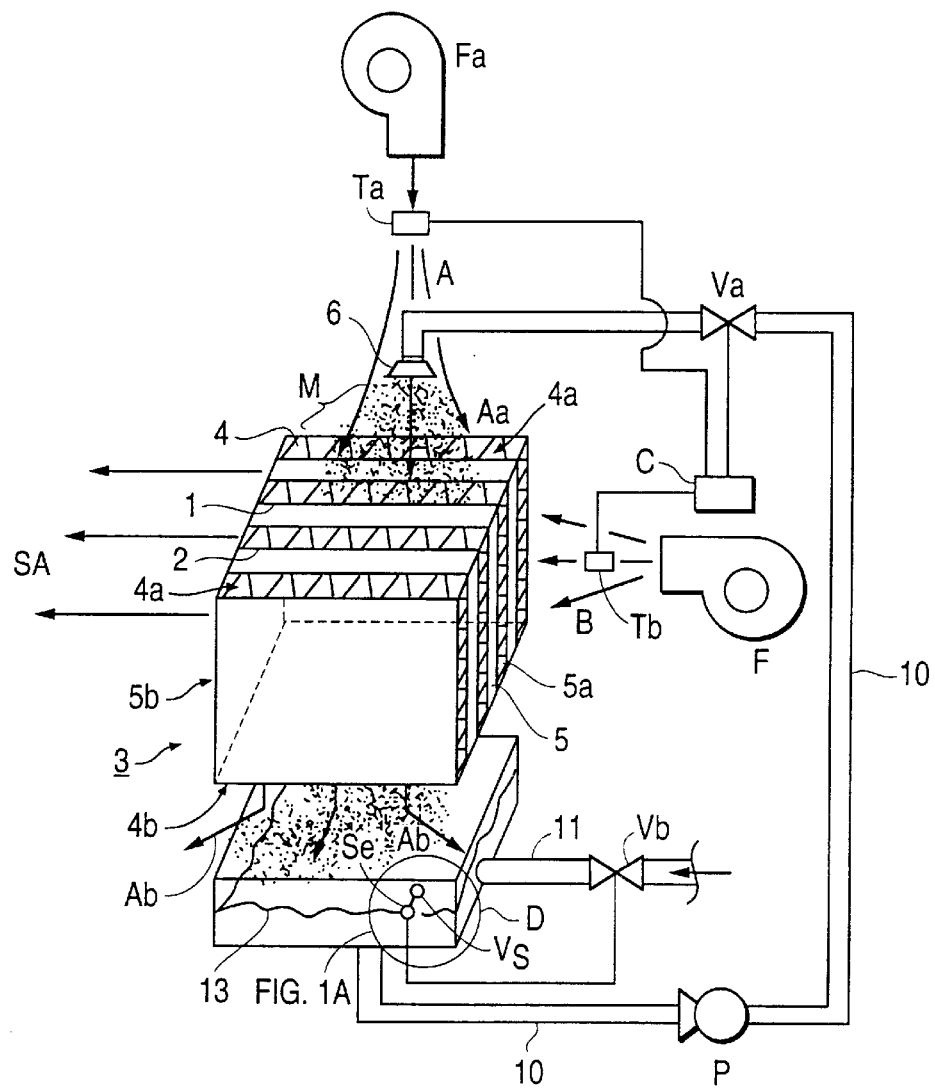
FIG. 1A is a perspective view of a device for fluid refrigeration according to the present invention.
Figure 1B:
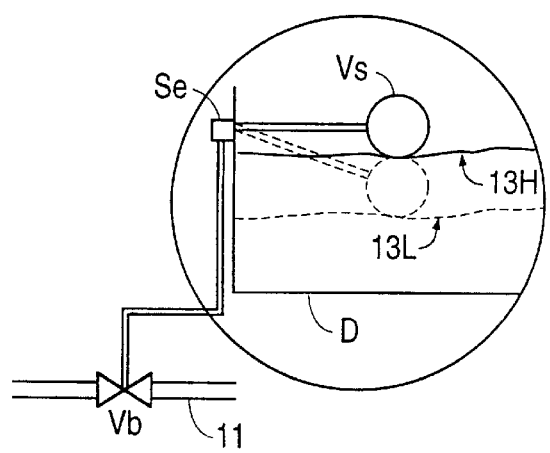
FIG. 1B is an enlarged side view of a portion of FIG. 1A.

Referring to FIGS. 1A and 1B, according to one aspect of the present invention, a volatile liquid mist is added to a gas flow A to saturate the gas with the liquid. What results is gas flow Aa in which a large amount of misty minute liquid drops M float. Gas flow Aa passes through one flow passage of a heat exchanger 3 having multiple flow passages, and a gas flow B to be refrigerated is passed through another flow passage of heat exchanger 3. (As an alternative, instead of gas flow B, a liquid flow can pass through the heat exchanger and be refrigerated.) In this manner, sensible heat from gas flow B is given to the gas flow Aa while the gas flow Aa passes through the heat exchanger, to elevate the temperature of gas flow Aa. As the saturation ratio of the gas flow Aa (for example, if the volatile liquid is water, the "saturation ratio" is the relative humidity) lowers, a large amount of minute liquid drops M floating in the gas flow Aa are vaporized, and the temperature of the gas flow Aa drops continuously from the heat of vaporization of the liquid drops to continuously refrigerate the gas flow B. Thus a gas flow Aa, in which a large amount of minute liquid drops M float, is heated by sensible heat exchange with gas flow B through the heat exchanger, and gas flow B is refrigerated by vaporization of minute liquid drops M. Vaporization removes the heat of vaporization and decreases the temperature of the gas flow Aa.

EXAMPLE 1

Figure 2A:
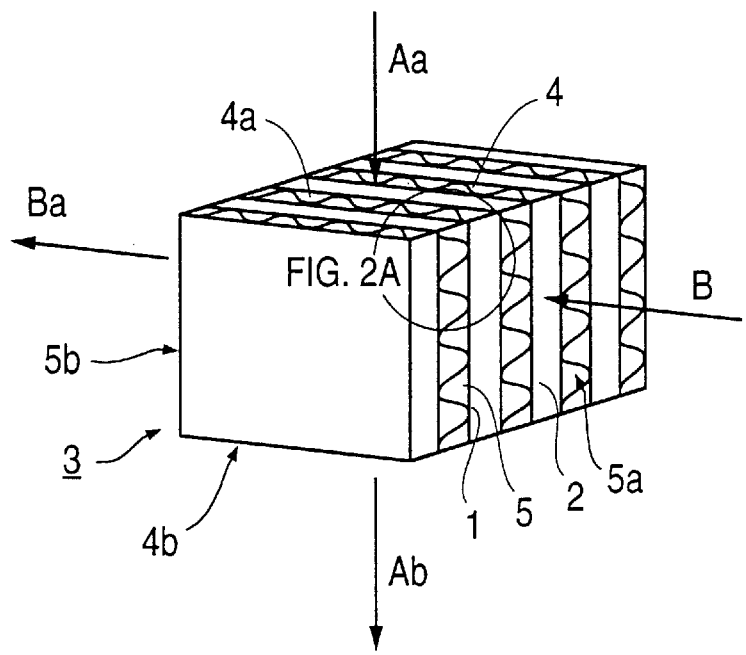
FIG. 2A is a perspective view of a cross-flow type heat exchanger used in the device of FIGS. 1A and 1B.
Figure 2B:
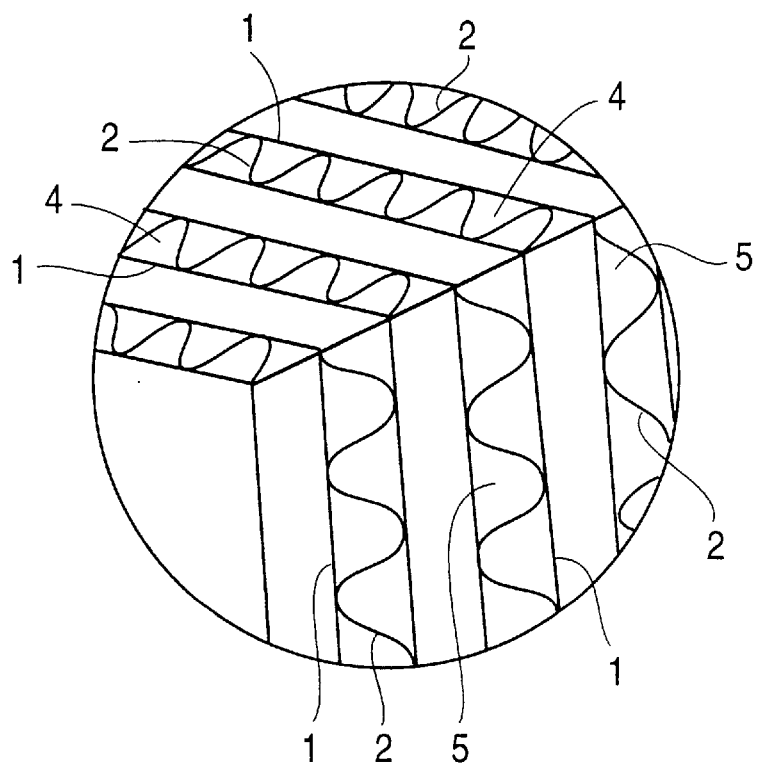
FIG. 2B is an enlarged perspective view of a portion of FIG. 2A.

Flat sheets 1 and corrugated sheets 2 are alternately laminated as shown in FIGS. 2A and 2B. Corrugated sheets have a 3.0 mm wave length and a 1.6 mm wave height. Both flat sheets 1 and corrugated sheets 2 consist of metal sheets such as aluminum, or synthetic resin sheets such as polyester. With the alternate lamination, the direction of the waves in the corrugated sheets 2 crosses rectangularly every step such that the waves extend perpendicular to one another. The flat and corrugated sheets are adhered to each other to obtain the cross-flow type heat exchanger 3 shown in FIGS. 2A and 2B. When small concave and convex surface portions are formed in the sheets 1, 2 by a blasting, etc. on the sheet surface, the sheets become hydrophilic and the surface area increases at the same time.

Aluminum sheets can be made hydrophilic by soaking the sheets in an aqueous solution of sodium phosphate, sodium hypochlorite, chromic acid, phosphoric acid, oxalic acid or caustic soda or by soaking the sheets in boiling water for a short time so that hydrophilic substances form on the surface of the aluminum sheets.

As a cross-flow type heat exchanger 3, a combination of flat sheets 1 and corrugated sheets 2 is shown for this example. When small waves are formed in the flat sheet, the surface area is further increased to increase heat exchange efficiency. When the surfaces of the flat sheet 1 and the corrugated sheet 2 are made black, radiation and absorption of radiant heat increases to improve heat exchange efficiency. When the sheet surface is treated, causing same to be hydrophilic, the formation of fluid drops, which may clog the channels and increase pressure drop, is prevented.

As shown in FIGS. 2A, 2B and 3, the cross-flow type heat exchanger 3 is set so that one group of small channels 4 is almost vertical and the other group of small channels 5 is almost horizontal. Hereinafter reference numerals 4 and 5 will denote respectively the vertical and horizontal channels. As shown in FIG. 3, a duct 8a and a duct 8b are installed at a flow inlet 4a and at a flow outlet 4b of the group of small channels 4, respectively. Duct 8a is equipped with a fan Fa and a spraying device 6. A duct 9a and a duct 9b are installed at a flow inlet 5a and a flow outlet 5b of the group of small channels 5 (FIGS. 2A and 2B), respectively. The duct 9a is equipped with a fan F. In the drawing, Va is a valve that regulates the spray amount of the spraying device 6.

For spraying device 6, it is preferable to use a water spray which forms the water drops as small as possible. For example, an air mist nozzle may be used. The individual water drops, which should be as small as possible, may have an average diameter of 10 $\mu$m. When the largest diameter of the water drops sprayed by an air mist nozzle is adjusted to be around 280 $\mu$m, about 70% of water drops have diameters smaller than 100 $\mu$m and the heat exchange effect of the present invention is best seen.

With an air mist nozzle which sprays water and air, and the water drops become smaller when both the water and the air are pressurized. The size of water drops is easily affected by the air pressure, and it is desirable to use a pressure of more than 3 kgf/cm$^2$. A nozzle using liquid only may be adapted for use as an air mist nozzle.

Now the operation of this refrigerating device will be explained. As shown in FIG. 3, the spraying device 6 mentioned above is used in an outer air or room air flow, gas flow A to spray to the gas flow A a large amount of minute water drops so that temperature drops from the heat of vaporization of the water drops and the relative humidity increases. What results is gas flow Aa in which a large amount of minute water drops M float. Gas flow Aa is sent into the many flow passage inlets 4a of the heat exchanger 3 under the force of fan Fa.

When high temperature gas flow B is sent into a flow passage inlet 5a of the heat exchanger 3 under the force of fan F, gas flow Aa takes sensible heat from high temperature gas flow B through a partition wall 1 (see FIGS. 2A and 2B) while the gas flow Aa passes through small channels 4 of heat exchanger 3 to thereby elevate the temperature of gas flow Aa. As a result, the relative humidity of gas flow Aa decreases and a large amount of minute water drops M contained in gas flow Aa vaporize. The vaporization lowers the temperature of gas flow Aa from the heat of vaporization of the water drops and refrigerates the high temperature gas flow B through the partition wall 1.

The refrigeration principle of the refrigerating device will now be explained in further detail. The vapor pressure of a liquid is greater when the liquid is in a drop form than when the liquid has a horizontal surface, and as the size of the liquid drop diameter decreases, the vapor pressure of liquid increases. This phenomenon is expressed by Kelvin's formula as follows:

$$\log (p_r/p) = 2\delta M/\rho rRT$$

In this formula, p is the vapor pressure on a horizontal surface, $p_r$ is the vapor pressure of a liquid drop of radius r, M is the molecular weight, $\delta$ is the surface tension, $\rho$ is the liquid density, R is the gas constant and T is absolute temperature.

Therefore, as the radius of water drops decreases, the speed of vaporization increases and the refrigeration effect becomes stronger. Furthermore, in the process of vaporizing sprayed water drops M in the heat exchanger 3, the diameter of water drops M becomes smaller. Also, as the diameter of water drops M decreases, the vapor pressure increases. Therefore, the speed of vaporization of water drops M accelerates. That is to say, minute water drops M vaporize in the heat exchanger 3 in an extremely short period of time and take away much heat of vaporization.

According to the formula mentioned above, in case of water of 18° C., vapor pressure increases by 0.1%, compared to water having a flat surface, when the radius of the water drops is 1 µm and by about 10% when the radius of the water drops is 10 nm. Vapor pressure is almost doubled when the radius of the water drops is lowered to 1 nm. When air with minute water drops M floating therein is sent into the heat exchanger 3 as mentioned above, a phenomenon is observed in which water drops M vaporize rapidly in heat exchanger 3.

Figure 4:
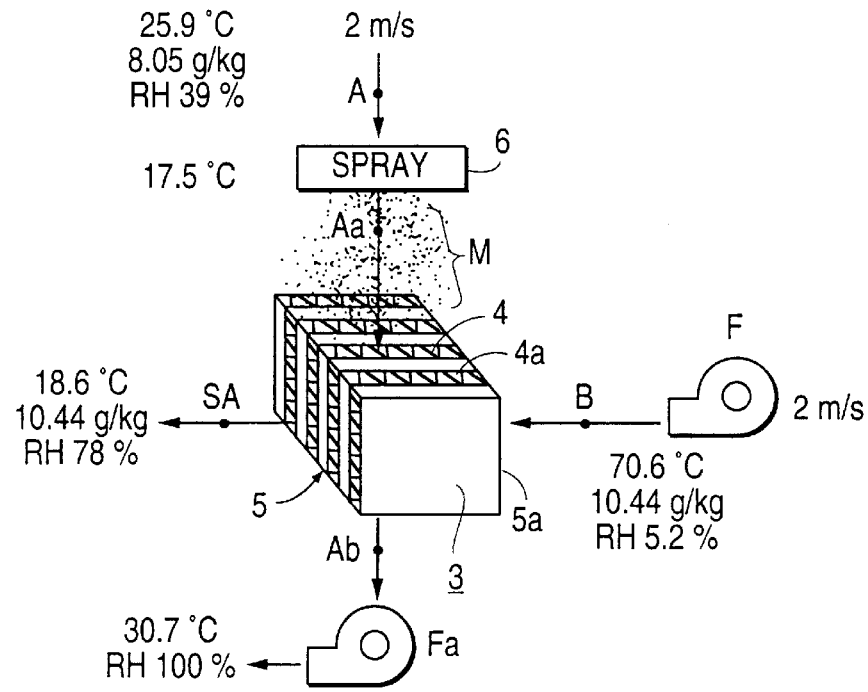
FIG. 4 is an explanatory drawing of still another example of the method and the device for fluid refrigeration of the present invention.
Figure 5:
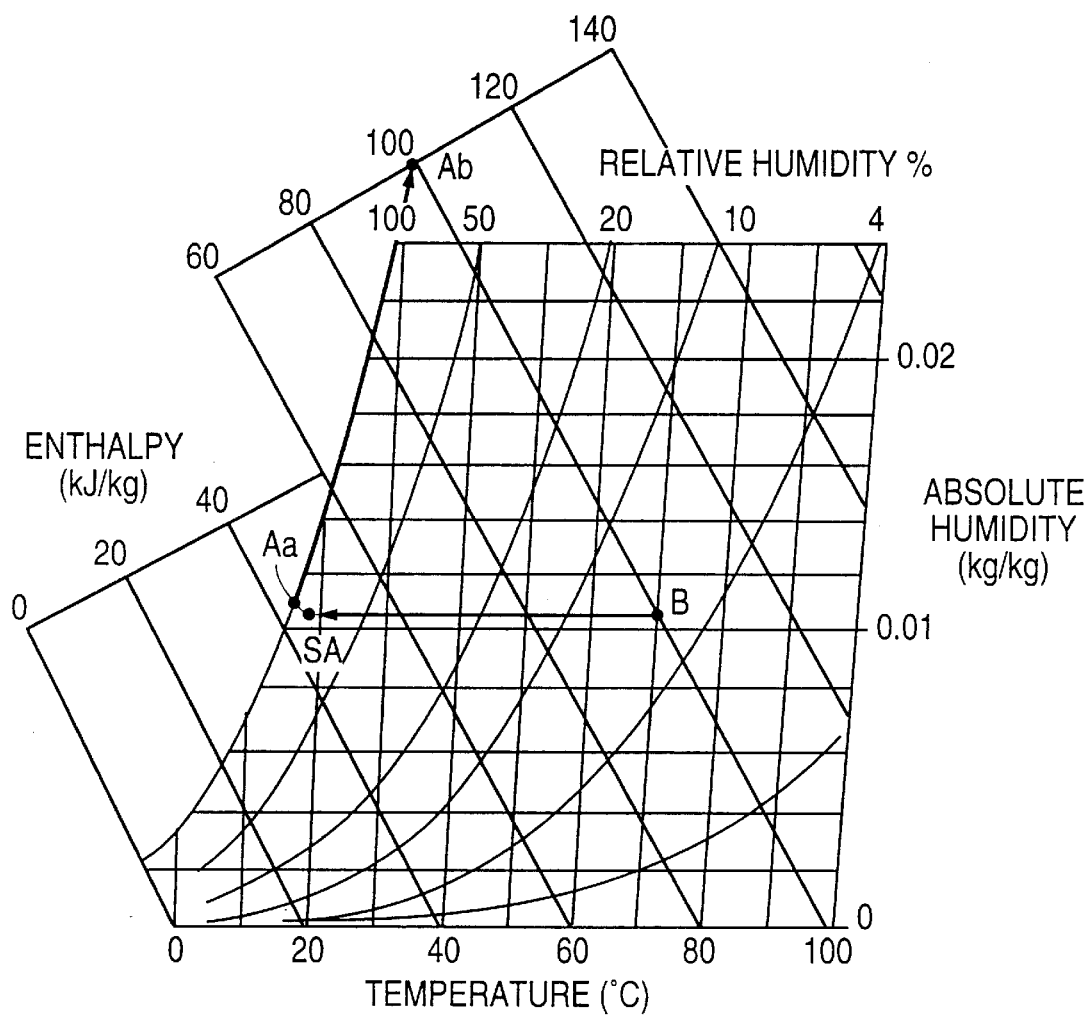
FIG. 5 is a psychrometric chart showing data of fluid refrigeration for reference to FIG. 4.

Tests were performed using this refrigerating device. As shown in FIG. 4, an air (gas) flow A having a temperature of 25.9° C., an absolute humidity of 8.05 g/kg and a relative humidity of 39% was passed through a spraying device humidifier 6 to lower its temperature to 17.5° C. and at the same time to make it into an gas flow Aa having 100% relative humidity in which a large amount of minute water drops M float. This gas flow Aa was sent into an inlet 4a of small channels 4 arranged almost vertically in the heat exchanger 3 at an air flow speed of 2 m/sec. On the other hand, a high temperature gas flow B of air having a temperature of 70.6° C., absolute humidity of 10.44 g/kg and a relative humidity of 5.2% was sent into a flow inlet 5a of small channels 5 arranged almost horizontally in the heat exchanger 3 at an air flow speed of 2 m/sec. Fan F forces gas flow B through channels 5. The small channels 4 and 5 do not have to be exactly perpendicular, and small channels 4 do not have to be exactly vertical. It is good enough if water drops pass through floating in the air. FIG. 5 is a psychrometric chart showing air refrigeration for the above test, and Table 1 lists the results.

TABLE 1

(with spray)
Example 1 (when the air flow B is of high temperature)

| | Temperature (° C.) | Absolute Humidity (g/kg) | Relative Humidity (%) |
|---|---|---|---|
| Air Flow A | 25.9 | 8.05 | 39 |
| Air Flow Aa | 17.5 | — | 100 |
| Air Flow B | 70.6 | 10.44 | 5.2 |
| Supply Air SA | 18.6 | 10.44 | 78 |
| Sensible Heat Exchange Efficiency | $\eta_1 = \dfrac{B - SA}{B - Aa} \times 100 = 97.9\%$ | | (1) |

Sensible heat exchange is performed between the high temperature gas flow B and the gas flow Aa, and the temperature of gas flow Aa is continuously lowered by vaporization of the minute water drops floating in gas flow Aa as mentioned above. Thus, gas flow B is refrigerated to lower its temperature without increasing its absolute humidity, to make gas flow B into comfortable air having a temperature of 18.6° C., an absolute humidity of 10.44 g/kg and a relative humidity of 78%. This air is to be used as supply air SA. By passing through heat exchanger 3, the gas flow Aa becomes a gas flow Ab having a temperature of 30.7° C. and a relative humidity of 100%. This gas flow Ab is emitted into the atmosphere.

The sensible heat exchange efficiency $\eta_1$ in this case is 97.9% as shown by the formula (1) in Table 1, which shows that the heat exchanger 3 is highly efficient. In the formula (1), B, SA and Aa are the temperatures of the corresponding gas flows. The amount of water sprayed as water drops was about 8–15 liters per hour. The flow rate of gas flows A and B in this case was about 180 m³/hour. The heat exchanger size was 0.25m×0.25m=0.0625m² in area. The surface area of its inlets 4a, 5a was 0.0625 m². The channel openings define about 40% of the inlet opening area. Therefore the cross sectional area of the small channels is 0.0625 m²×40%=0.025 m² and, with an air flow rate of 2 m/sec., the volumetric flow rate is 0.025 m²×2m/sec.=180 m³/hour.

Figure 6:
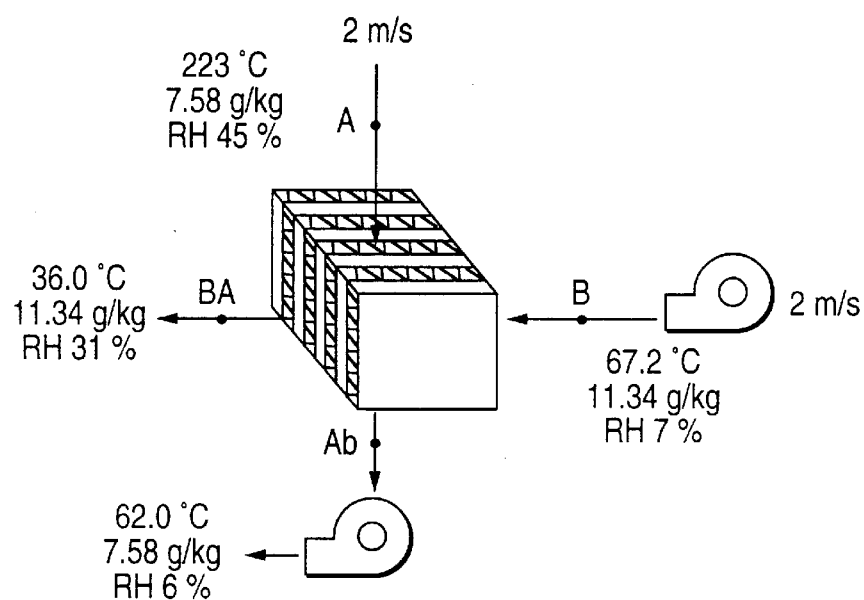
FIG. 6 is an explanatory drawing showing a contrasting example of the method and the device for fluid refrigeration.
Figure 7:
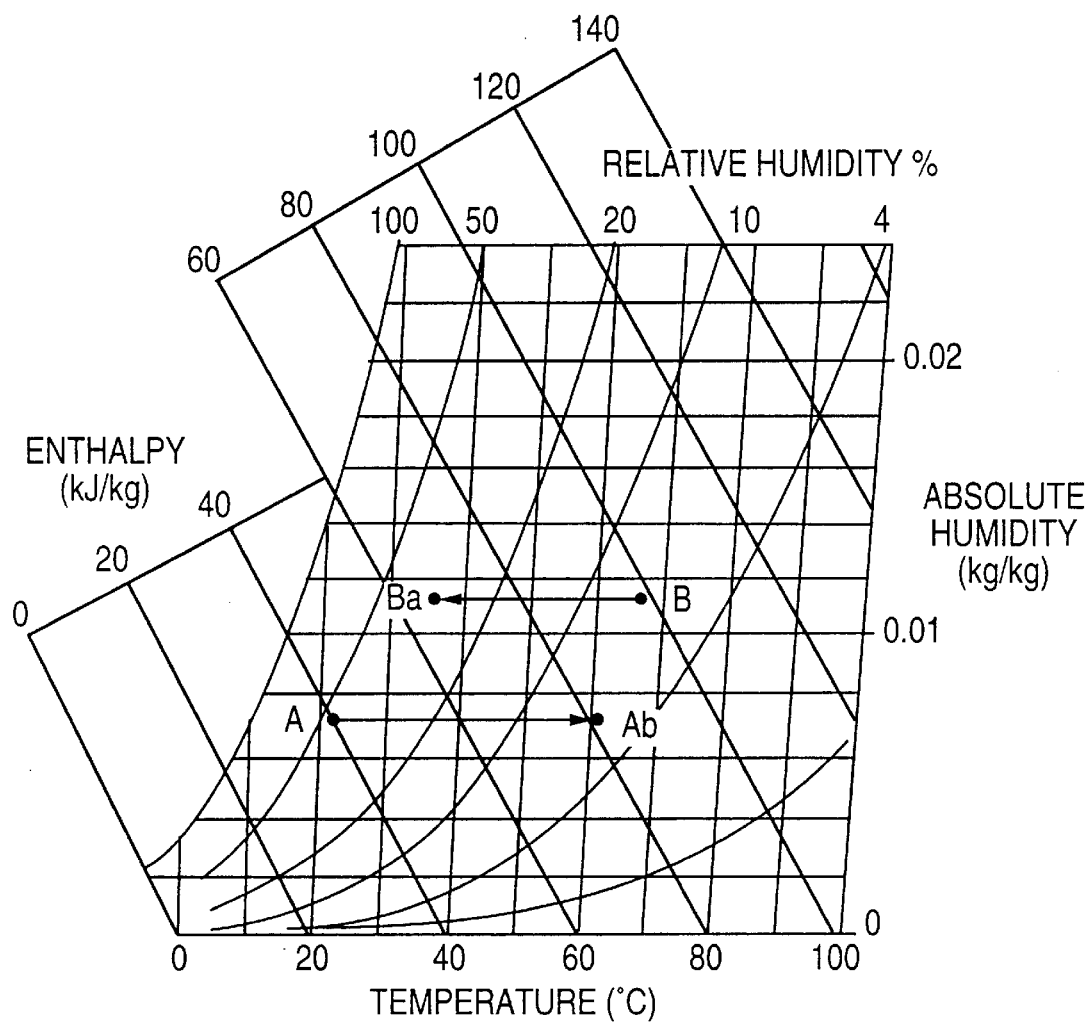
FIG. 7 is a psychrometric chart showing data of fluid refrigeration shown in FIG. 6.

For the purposes of comparison, the same cross-flow type heat exchanger of Example 1 was used without a water spray in gas flow A. See in FIG. 6, Table 2 and the psychrometric chart of FIG. 7.

TABLE 2

Contrasting Example (when the air flow B is of high temperature)

| | Temperature (° C.) | Absolute Humidity (g/kg) | Relative Humidity (%) |
|---|---|---|---|
| Air Flow A | 22.3 | 7.58 | 45 |
| Air Flow B | 67.2 | 11.34 | 7 |
| Supply Air Ba | 36.0 | 11.34 | 31 |
| Sensible Heat Exchange Efficiency | $\eta_1 = \dfrac{B - SA}{B - Aa} \times 100 = 69.5\%$ | | (2) |

In formula (2), B, Ba and A each denote the temperature of the corresponding gas flow.

A gas flow A having a temperature of 22.3° C. becomes gas flow Ab which has a temperature of 62.0° C. as a result of sensible heat exchange, and a high temperature gas flow B having a temperature of 67.2° C. becomes a gas flow Ba having a temperature of 36.0° C. by sensible heat exchange. Absolute humidity does not change in gas flow A and gas flow B.

The sensible heat exchange efficiency $\eta_1$ in this case is 69.5% as shown by formula (2) in Table 2. When water is sprayed, the sensible heat exchange efficiency is 97.9% (see Table 1). When water is not sprayed, it is 69.5%. Thus, spraying water increases the heat exchange efficiency by about 30%. The other experimental conditions are the same as when sprayed water was used in Example 1.

EXAMPLE 2

Figure 8:
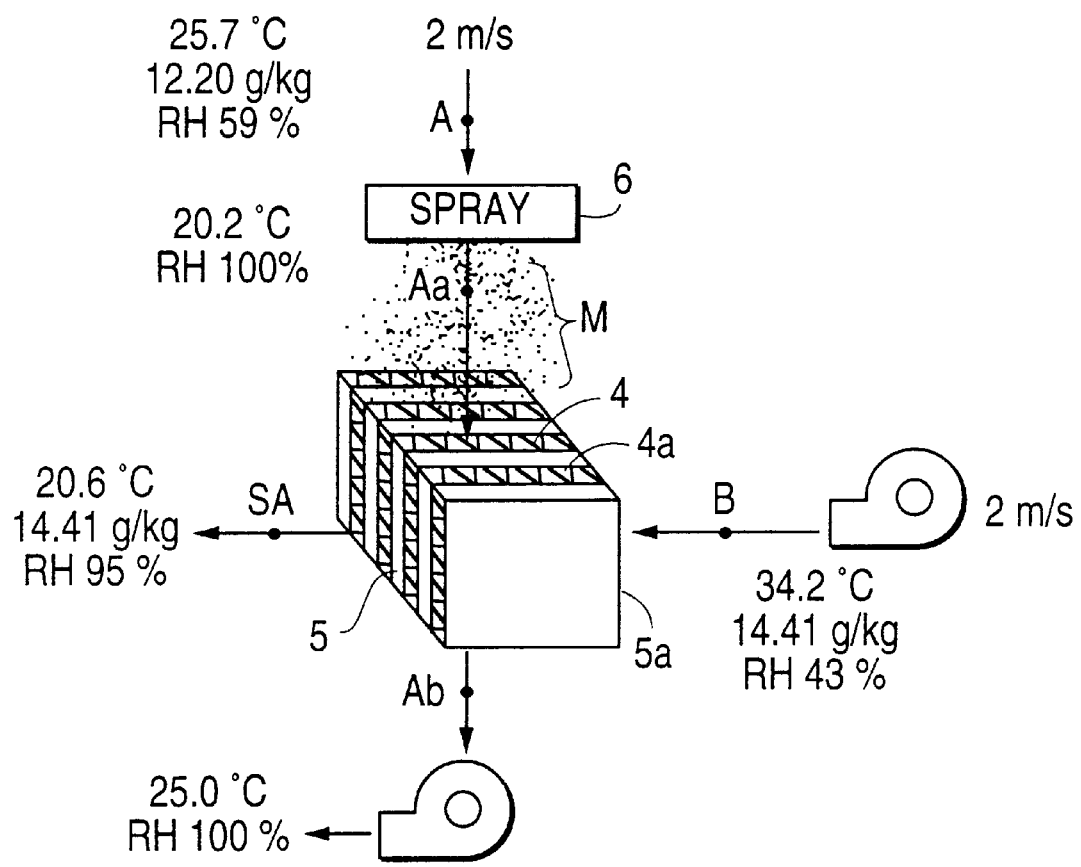
FIG. 8 is an explanatory drawing showing still another example of the method and the device for fluid refrigeration of the present invention.

Using the refrigerating device in the manner shown in FIG. 8, air having a temperature 25.7° C., an absolute humidity of 12.20 g/kg and a relative humidity of 59.0% is provided as gas flow A of wind velocity 2 m/sec. This is passed through a spraying device 6 to obtain a gas flow Aa having a temperature of 20.2° C., a relative humidity of 100% and a large amount of misty minute water drops floating therein.

Figure 9:
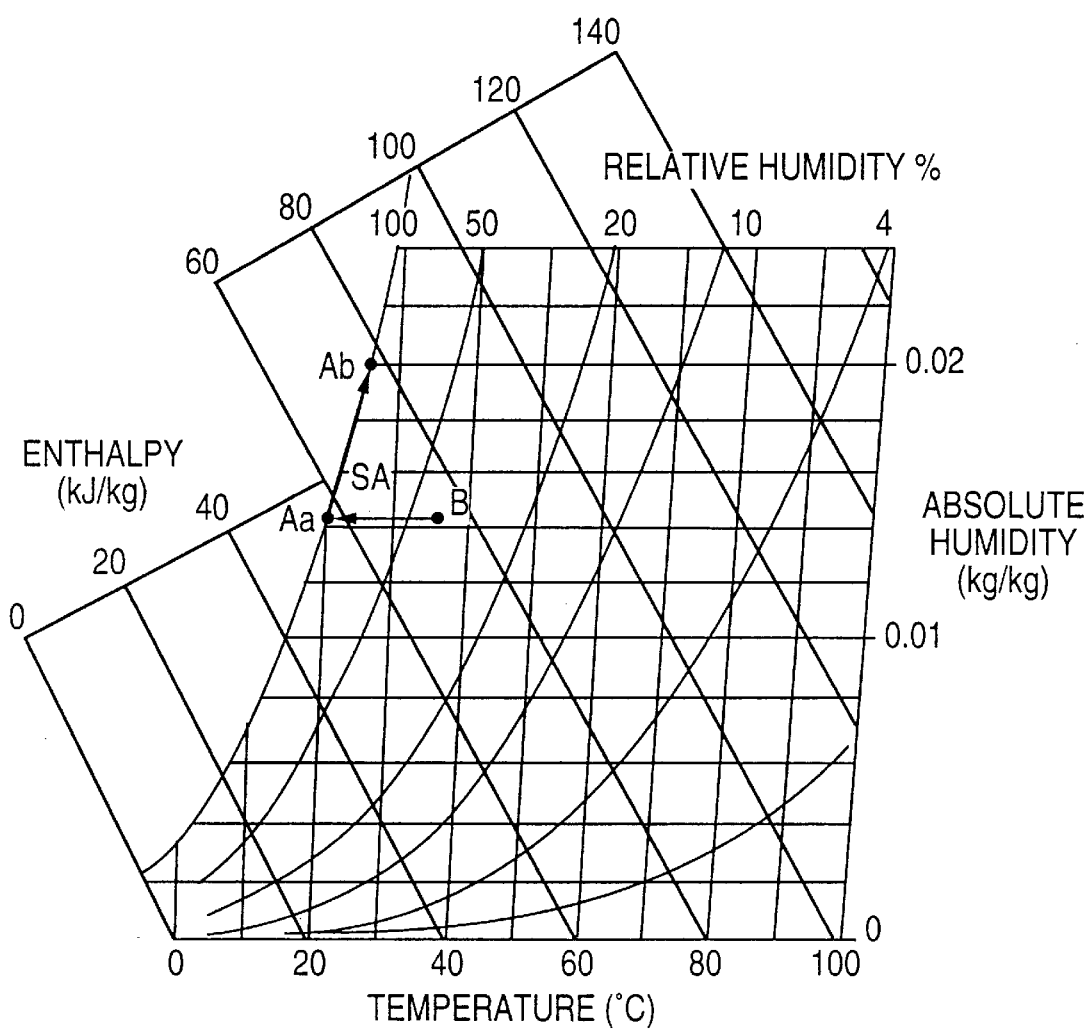
FIG. 9 is a psychrometric chart showing data of fluid refrigeration shown in FIG. 8.

Gas flow Aa is sent into inlet 4a of small channels 4 of a heat exchanger. High temperature air to be refrigerated having a temperature 34.2° C., an absolute humidity of 14.41 g/kg and a relative humidity of 43% is provided as gas flow B having a wind velocity 2 m/sec., which is sent into inlet 5a of small channels 5 of the heat exchanger. Sensible heat exchange occurs between the gas flow B and the gas flow Aa, and gas flow B becomes supply air SA having a temperature of 20.6° C., an absolute humidity of 14.41 g/kg and a relative humidity of 95%. Gas flow Aa becomes a gas flow Ab having a temperature of 25° C. and a relative humidity of about 100%. Gas flow Ab is emitted into the atmosphere. The psychrometric chart in this case is shown in FIG. 9 and the test data is shown in Table 3.

TABLE 3

(with spray)
Example 1 (air flow B is of the normal temperature)

| | Temperature (° C.) | Absolute Humidity (g/kg) | Relative Humidity (%) |
|---|---|---|---|
| Air Flow A | 25.7 | 12.20 | 59.0 |
| Air Flow Aa | 20.2 | — | 100 |
| Air Flow B | 34.2 | 14.41 | 43 |
| Supply Air SA | 20.6 | 14.41 | 95 |
| Sensible Heat Exchange Efficiency | $\eta_1 = \dfrac{B - SA}{B - Aa} \times 100 = 97.1\%$ | | (3) |

As shown in the FIG. 9, the heat of vaporization of the water drops in gas flow Aa is transmitted to the gas flow B via the partition wall to lower the temperature of gas flow B without changing the absolute humidity of gas flow B. As shown by the horizontal line of the psychrometric chart, until gas flow B reaches the saturation point at SA (20.6° C.), and the temperature of gas flow Aa rises until it reaches the point Ab along the line of saturation (relative humidity 100%). Sensible heat exchange efficiency in this case is 97.1% as shown by formula (3) in Table 3, which is almost the same sensible heat exchange efficiency of Example 1. That is, when the temperature of gas flow B is lower, the temperature of the resulting supply air SA can be maintained at 20.6° C., which is appropriate for air conditioning, by decreasing the amount of water sprayed. The amount of water sprayed is about 8 liters/hour.

EXAMPLE 3

As shown in FIGS. 1A and 1B, the device shown in FIG. 3 may have a water tank D which receives water drops emitted via gas flow Ab, a recirculation device for the water pooled in said tank D (e.g., a pump P, a water leading pipe 10 and an electric valve Va), a water level regulating device (e.g., a water level float Vs, a water level sensor Se and an electric valve Vb), and a spray amount regulating device for regulating the amount of water supplied to spraying device 6 (e.g., a thermocouple Ta, a thermocouple Tb, an electric signal amplifier C, and electric valve Va). In the drawing, parts numbered in the same way as in FIG. 3 are not explained as they are the same parts explained for FIG. 3 in Example 1.

Water leading pipe 10 recirculates water in water tank D into spraying device 6. Pump P and electric valve Va are provided in-line in the water leading pipe 10. A water supply pipe 11 is installed to a water tank D. A water level float Vs floats on the surface 13 in tank D. Electric valve Vb is an on-off electromagnetic valve provided in-line in the water supply pipe 11 and is connected to water level sensor Se. As shown in the enlarged portion Q of FIGS. 1A and 1B, a change in the water level is detected by water level float Vs and the water level sensor Se. When the water level decreases to a level 13 L, the electromagnetic valve Vb opens to supply water. When the water level is increased to a level 13 H, the electromagnetic valve Vb closes to stop the supply of water.

As a temperature sensor to sense the temperature of gas flow A, thermocouple Ta may be provided on the upstream side of the spraying device 6. Another temperature sensor, such as thermocouple Tb, senses the temperature of gas flow B. The thermocouples Ta and Tb are connected to an electric signal amplifier C. The difference between the temperatures detected by thermocouples Ta and Tb is determined and a signal is supplied to electric signal amplifier C. As the temperature difference increases, the electric valve Va is opened to increase the volume of water sprayed, and as the temperature difference decreases, electric valve Va is closed to decrease the volume of water sprayed. The flow velocity of the gas flow Aa is increased by increasing both the volume of water sprayed and the output of fan Fa.

When the amount of water sprayed from spraying device 6 is too much, minute water drops gather on the inner wall of small channels 4 of the heat exchanger 3 and drip down without fully vaporizing. The surface area of water flowing down the small channels 4 is extremely small compared with that of minute water drops, and this restricts the amount of water which can evaporate from heat taken away from high temperature gas flow B. Therefore, the temperature of gas flow Aa cannot be fully lowered, which in turn restricts the temperature drop of high temperature gas flow B. When water is sprayed in the proper amount, minute water drops M are uniformly distributed in the gas flow Aa and in a necessary amount, refrigeration proceeds efficiently and water is saved.

EXAMPLE 4

Instead of water (boiling point 100° C.) being used for spraying device 6, a volatile organic liquid may be used. Examples of the volatile organic liquids are ethanol (boiling point 78.3° C.), methyl acetate (boiling point 56.3° C.) and methanol (boiling point 64.7° C.), or a mixture of one or more volatile organic liquids and water.

Figure 10:
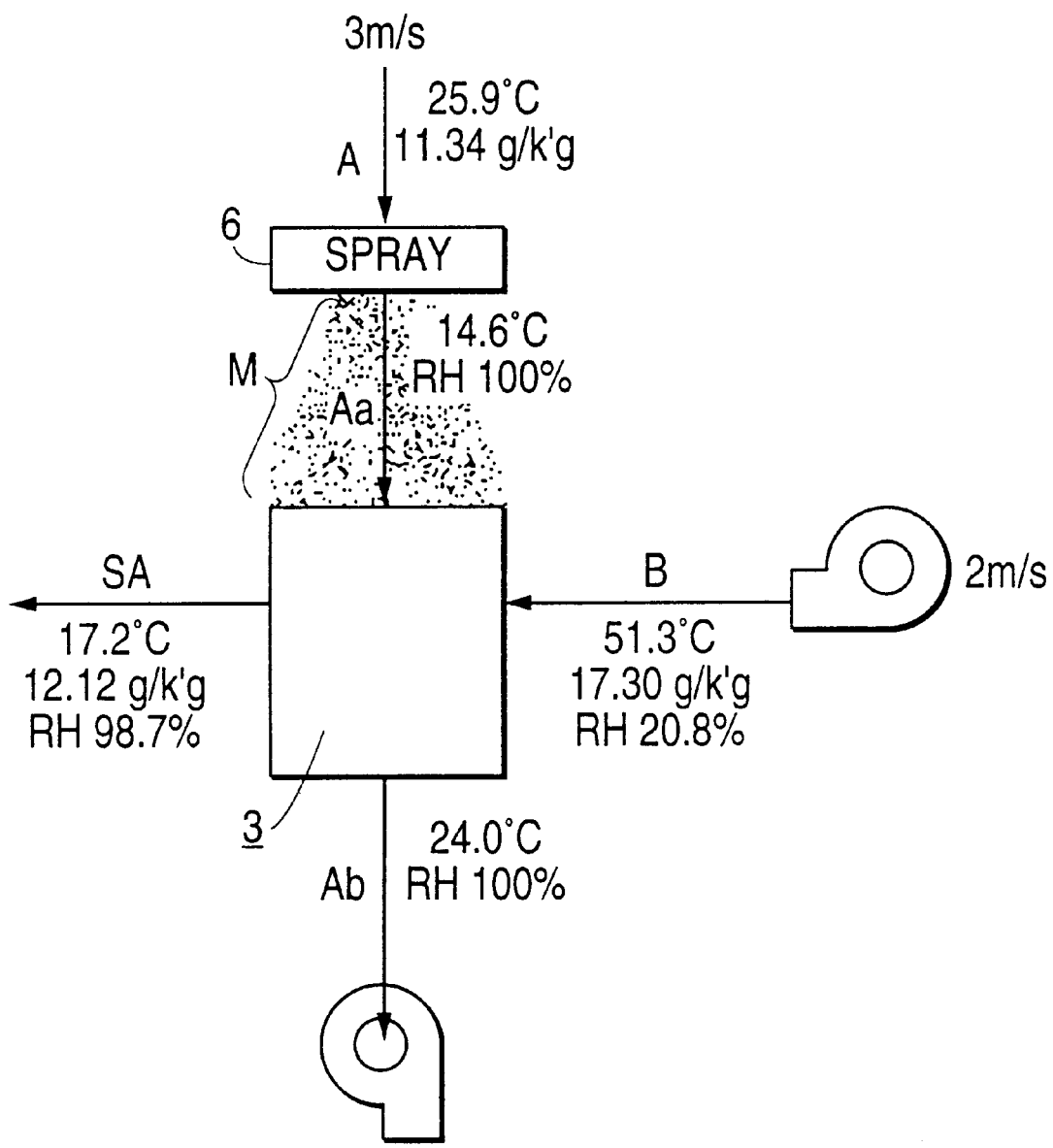
FIG. 10 is an explanatory drawing showing data of fluid refrigeration of the present invention using aqueous solution of methanol.

Minute particles of desiccant silica gel are sprinkled on and adhered to both surfaces of a partition wall 1, and a corrugated sheet 2 having a wave length of 3.4 mm and a wave height of 1.7 mm (see FIG. 2), both being a 25 μm thick aluminum sheet. The partition wall 1 and corrugated sheet 2 are laminated alternately to obtain the cross-flow type heat exchanger 3 having a size of 250 mm×250 mm×250 mm. A refrigerating device shown in FIG. 10 is constructed using this heat exchanger 3. FIG. 10 also shows data of an example which used this device and a 45% aqueous solution of methanol for spraying device 6 instead of the water used for Examples 1 and 2. The aqueous solution of methanol had a lower boiling point than water and the temperature of gas flow A decreased from 25.9° C. to 14.6° C. (gas flow Aa) after spraying the aqueous solution of methanol.

Figure 11:
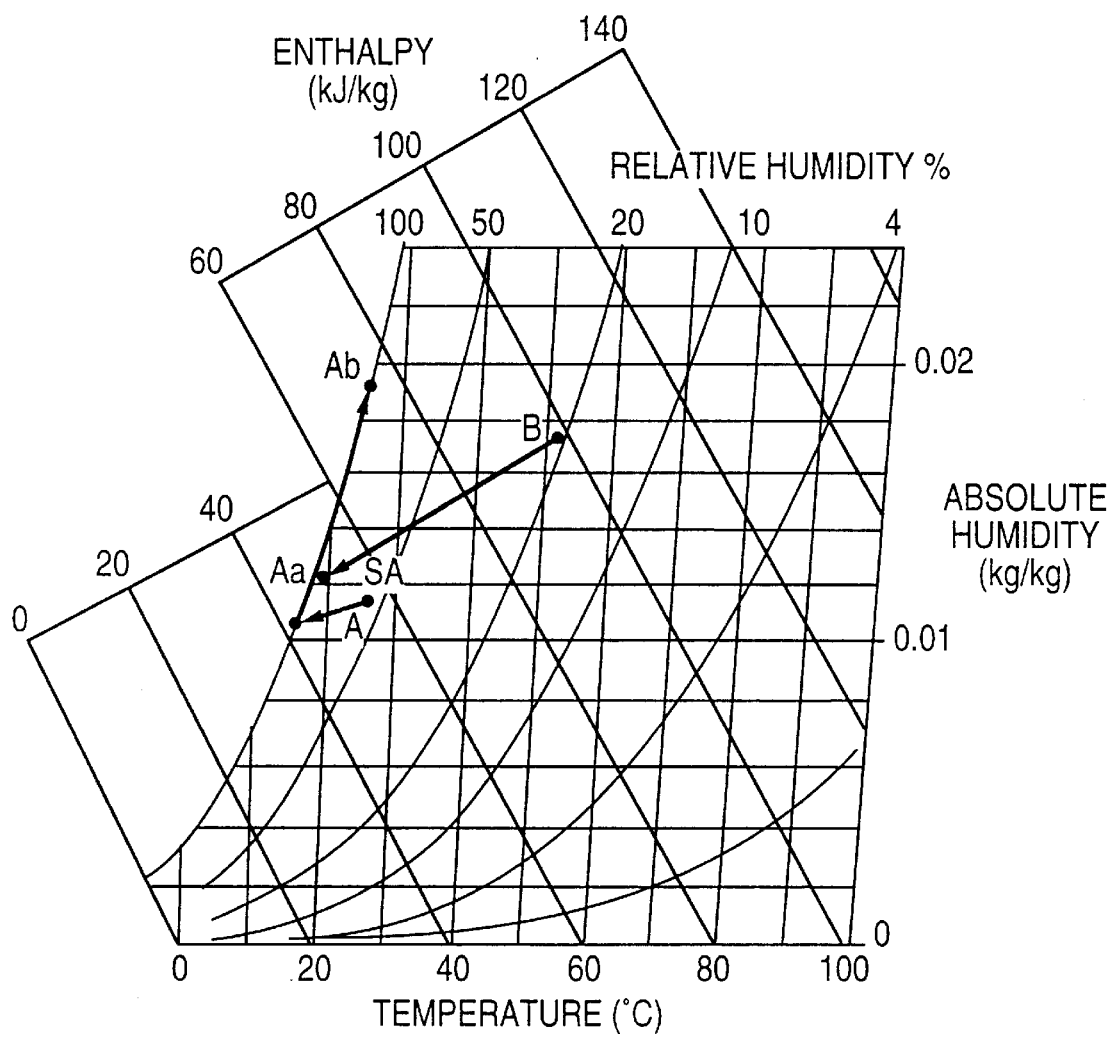
FIG. 11 is a psychrometric chart showing data of refrigeration using aqueous solution of methanol.

The supply air SA obtained had a temperature of 17.2° C. as a result of heat exchange with gas flow Aa which had a temperature of 14.6° C. High temperature gas flow B had a temperature of 51.3° C. Thus, in order to obtain supply air SA having a lower temperature, it is better to spray liquid which has lower boiling point than it is to spray only water. Psychrometric chart of FIG. 11 shows the condition changes of the gas flow B→SA and the gas flow A→Aa→Ab outlined above.

EXAMPLE 5

Figure 12:
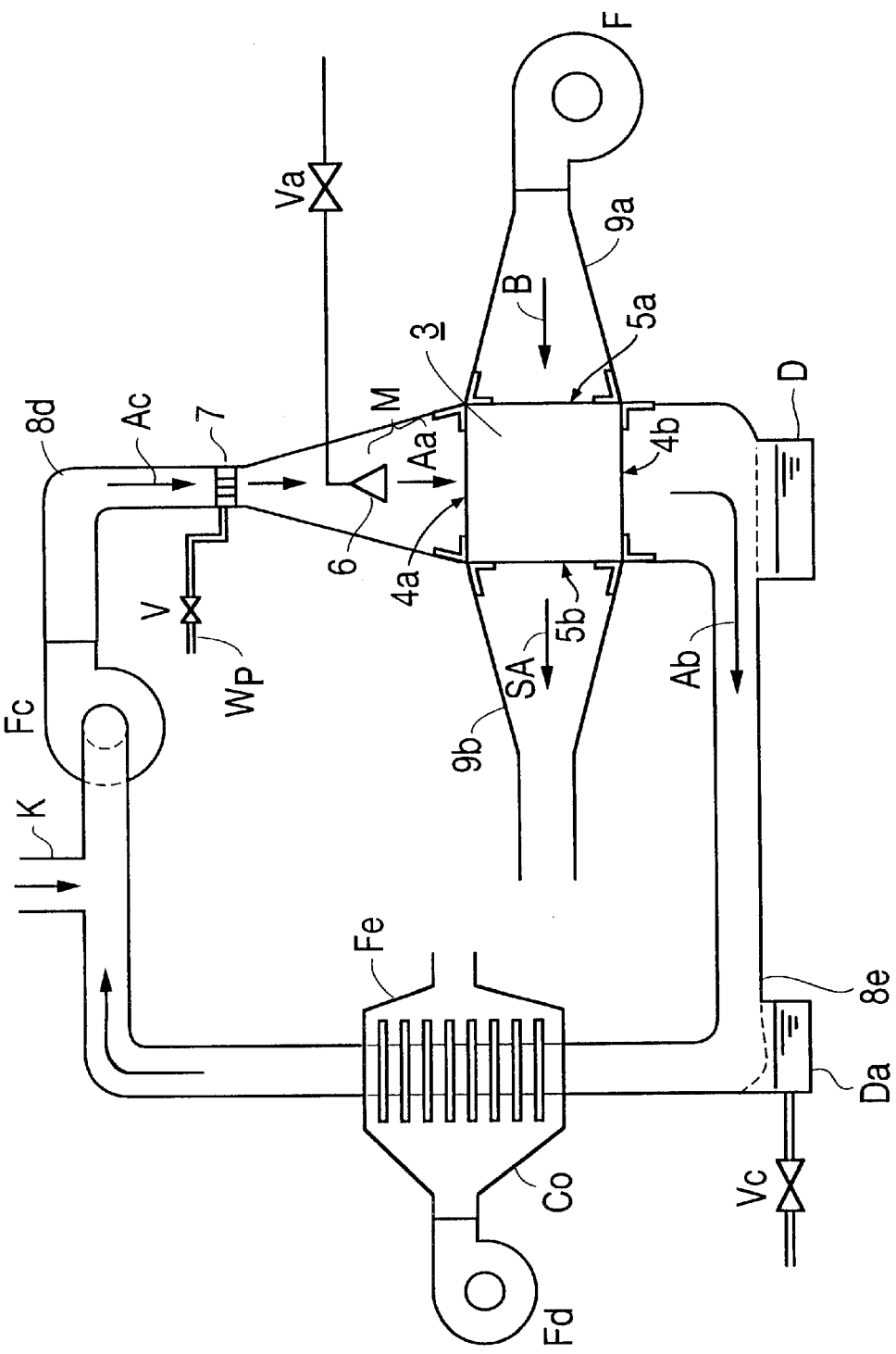
FIG. 12 is an explanatory drawing showing still another example of the method and the device for fluid refrigeration of the present invention.
Figure 13:
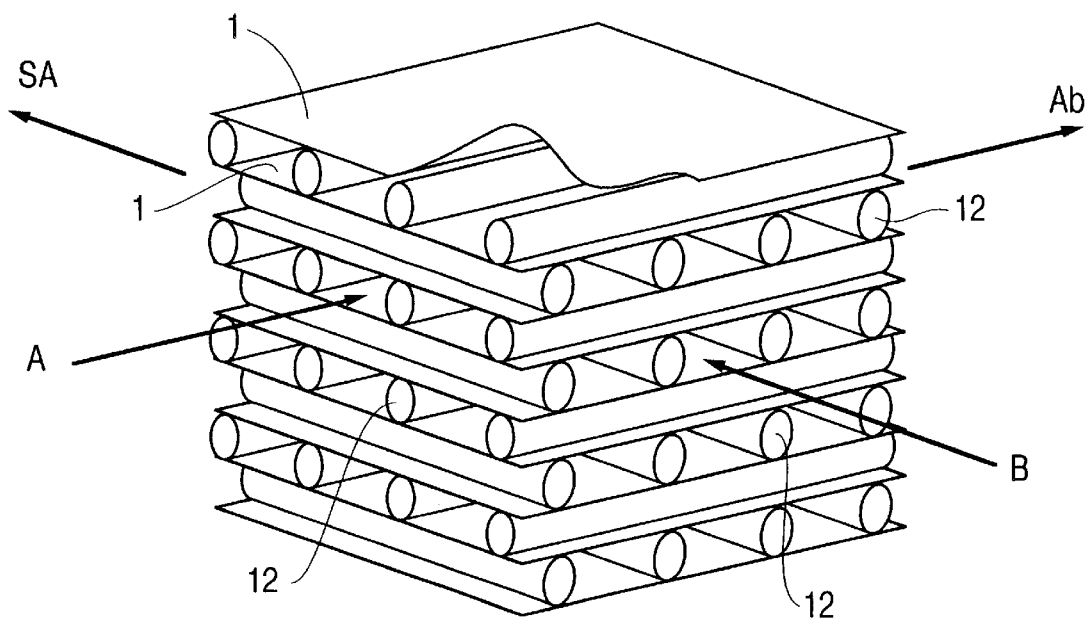
FIG. 13 is a perspective view showing another example of a cross-flow type heat exchanger.

The device of the present example, as shown in FIG. 12, consists of the device explained in Example 1 to which is added a device for recirculating a gas flow Ab exhausted from the outlet 4b of heat exchanger 3 to be reused as gas flow Aa which is highly humid. A humidifier 7 is provided upstream from spraying device 6. In FIG. 12, the outlet 4b of heat exchanger 3 and a fan Fc are connected by a duct 8e. The fan Fc and the flow passage for the highly humid gas flow Aa are connected with a duct 8d. A diverging duct K for supplying outer air OA when necessary is connected to duct 8e.

The humidifier 7 is provided with a valve V in-line in a water supply pipe Wp so that water can be supplied when humidification is necessary. Examples of humidifier 7 include an ultrasonic type humidifier and a humidifier which uses multiple woven cloths soaked in water.

Gas flow Aa is passed through heat exchanger 3, and gas flow Ab from outlet 4b is recirculated by fan Fc to be used as a gas flow Ac. This gas flow Ac is passed through humidifier 7 which humidifies when necessary, and is made into gas flow Aa in which a large amount of minute water drops M float as a result of spraying device 6. Gas flow Aa is sent through heat exchanger 3.

In FIG. 12, the duct 8e is provided with a refrigerating part Co therein. Many fins Fe are provided on the outer surface of the duct 8e which fins are covered by a cover. A fan Fd is connected to this. By refrigerating the fins Fe with fan Fd, gas flow Ab (a fluid) in duct 8e is refrigerated to condense liquid contained in gas flow Ab which is highly humid. Condensed liquid (water) is collected in tank Da and water in the tank Da is drained and sent back to water spray humidifier spraying device 6 from time to time by a valve Vc.

The refrigeration method of fluids of the present invention has so far been explained as a refrigeration method for air which method uses a cross-flow type heat exchanger. It is a matter of course that the refrigeration method can be used for refrigeration of a gas other than air or a liquid such as water.

EXAMPLE 6

Figure 14:
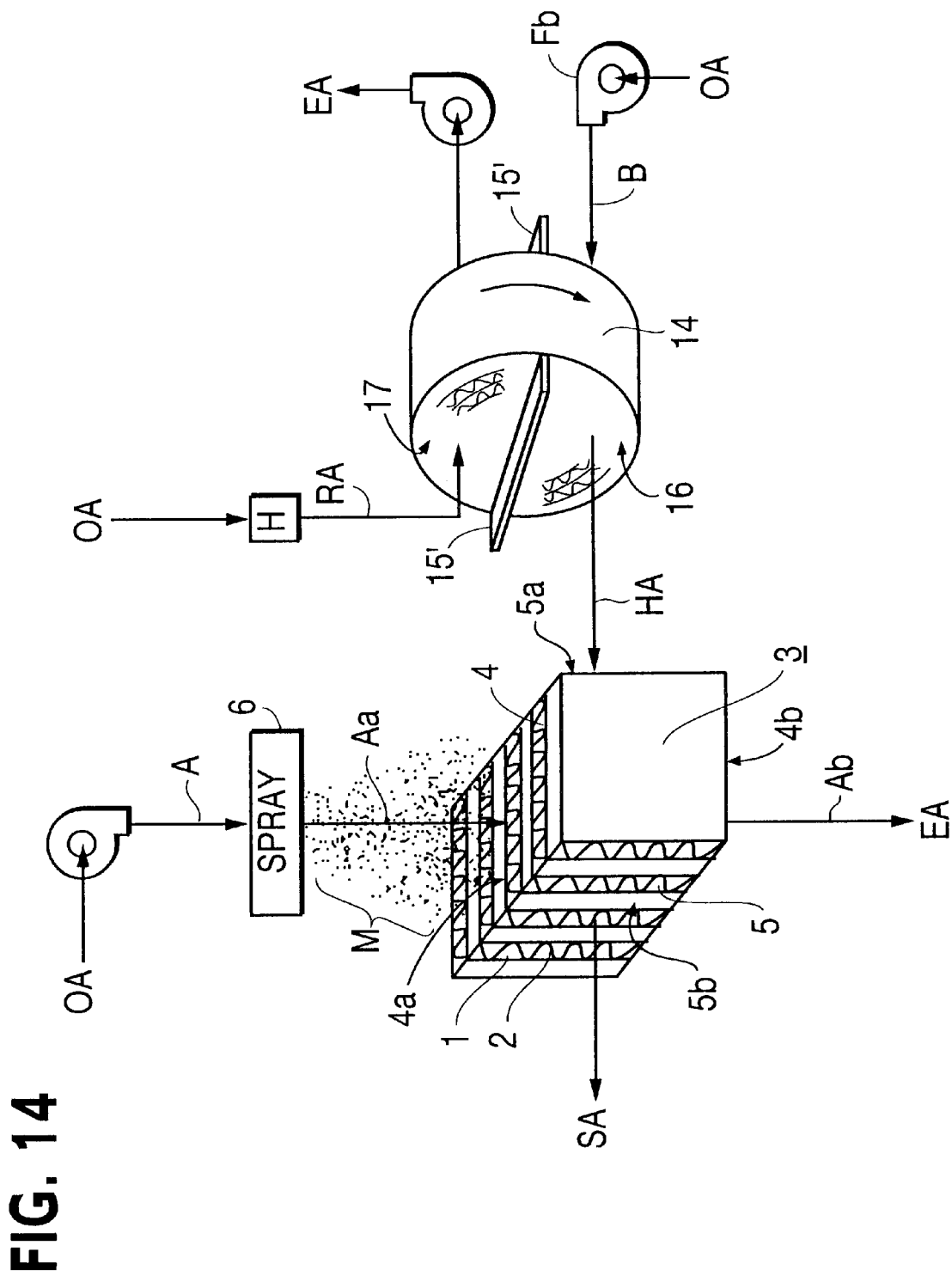
FIG. 14 is an explanatory drawing showing an example of the method and the device for desiccative refrigeration of gas of the present invention.

As shown in FIG. 14, a cross-flow type heat exchanger 3 having a size of 250 mm×250 mm×250 mm and a spray humidifier 6 are provided, and a dehumidifier rotor 14 receives gas flow B upstream from heat exchanger 3. The dehumidifier rotor 14 is constructed by forming a honey-comb laminate, having an adsorbent or hygroscopic agent therein. The honeycomb laminate is formed into a cylindrical shape having a diameter of 320 mm and a width of 200 mm. The dehumidifier rotor 14 is divided into an adsorbing zone 16 and a reactivating zone 17 by separators 15, 15'. The air is transferred with a duct (not shown in the drawing) as indicated by arrows B→HA→SA. The dehumidifier rotor 14 is continuously rotated and operated at a speed of 16 r.p.h. in the direction shown by the arrow in the drawing. Outer air OA having a temperature of 34.0° C., an absolute humidity of 14.4 g/kg and a relative humidity of 43.1% is made into a gas flow B by a fan Fb, and the gas flow B is sent into the adsorbing zone 16 of the dehumidifier rotor 14 at an air speed of 2 m/sec.

Humidity in gas flow B is adsorbed and removed by the dehumidifier to obtain a dry air flow HA. Then the dry air flow HA is sent into the inlet 5a of horizontal small channels 5 of the heat exchanger 3. Outer air OA is heated to around 80° C. by the heater H and is sent into the reactivating zone 17 of the dehumidifier rotor 14 in the direction of the arrow in the drawing as reactivation air RA. The dehumidifier rotor 14 is dehumidified and reactivated in the reactivating zone 17, and the reactivation air RA is emitted in the atmosphere as humid exhaust air EA.

On the other hand, gas flow A having a temperature of 26° C. and a relative humidity of 58% is humidified by spraying device 6 to have 100% relative humidity, and the temperature of gas flow Aa becomes 17.0° C. At the same time, many minute water drops are caused to float. The gas flow Aa is sent into the flow inlet 4a of the heat exchanger 3.

The dry air flow HA mentioned above passes through the heat exchanger 3, and sensible heat exchange is performed with the gas flow Aa in which many minute water drops float. Dry air flow HA is refrigerated in heat exchanger 3 from the heat of vaporization of minute water drops in the gas flow Aa, which is similar to that of Example 1, to obtain comfortable supply air SA having a temperature 20.5° C., an absolute humidity of 4.5 g/kg and a relative humidity of 30%.

As is seen from this example, by dehumidifying outer air originally having a temperature 34° C., an absolute humidity of 14.4 g/kg and a relative humidity 43.1% and by passing the obtained dry air, whose temperature has been elevated by heat of adsorption of humidity through the heat exchanger 3, refrigerated dry air having a temperature of 20.5° C., an absolute humidity of 4.5 g/kg and a relative humidity of 30% can be obtained. In using this air for air conditioning, it can be appropriately humidified to obtain comfortable air conditions.

Other examples of dehumidifiers include a two-cylindered type dehumidifier which is filled with a hygroscopic agent, a cylindrical-type and a Kathabar (trademark) type dehumidifier provided from Kathabar company, U.S.A. In the Kathabar type humidifier, many drops of aqueous lithium chloride fall from the top of a vertical cylinder, through the cylinder. Air of high humidity passes horizontally through the falling drops within the cylinder via a hole in a side wall of the cylinder.

EXAMPLE 7

In the present example, a process is explained for dehumidification by a dehumidifier rotor after refrigeration of high temperature air having a temperature of 70.0° C. by a heat exchanger.

Figure 15:
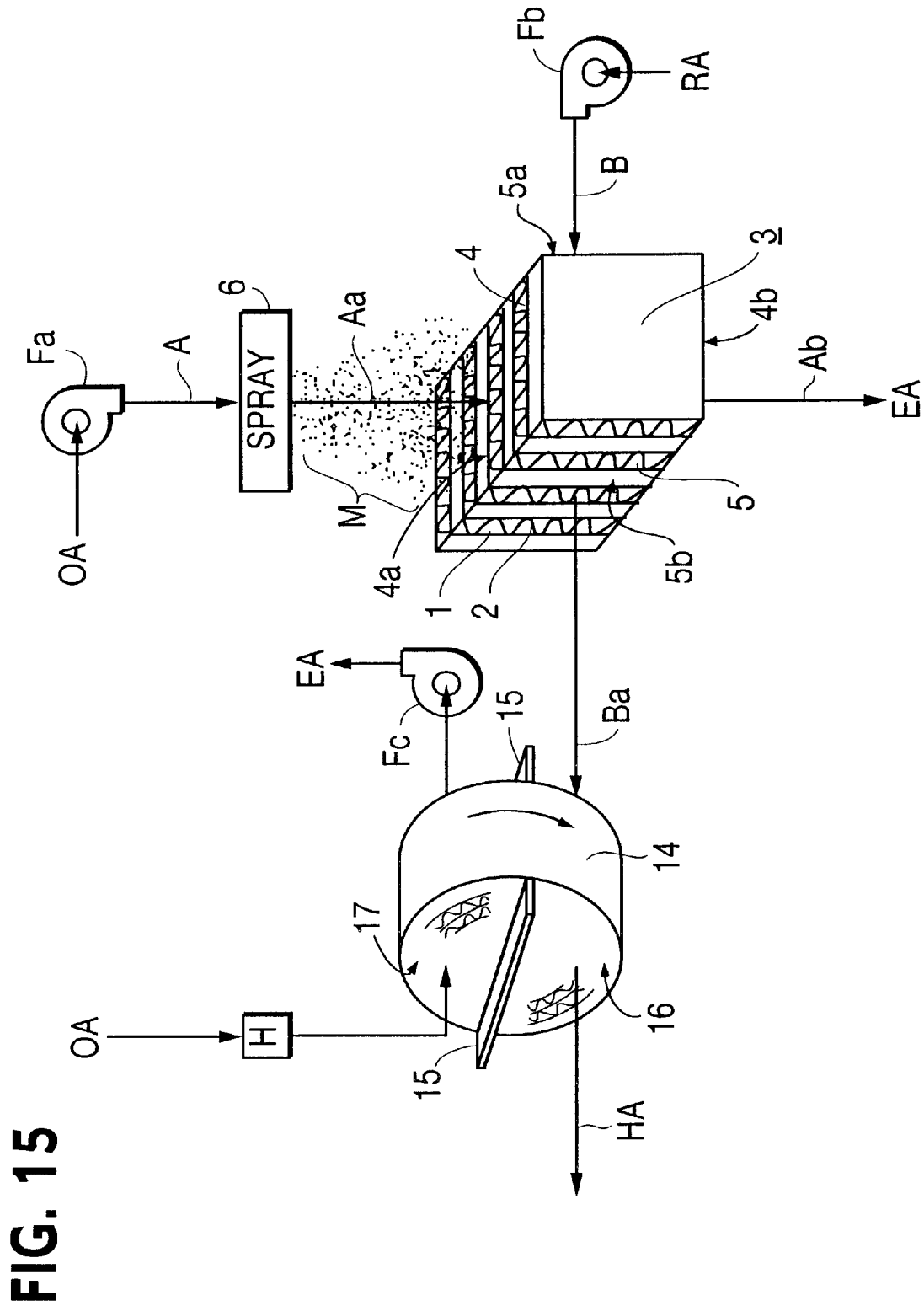
FIG. 15 is an explanatory drawing showing another example of the method and the device for desiccative refrigeration of gas of the present invention.

As shown in FIG. 15, a spraying device 6 is installed on an upstream side of a cross-flow type heat exchanger 3, and a dehumidifier rotor 14 is installed on a downstream of the heat exchanger 3. Water is sprayed by spraying device 6 to outer air OA having a temperature of 26.0° C., an absolute humidity of 12.2 g/kg and a relative humidity of 58%, which outer air is blown through a fan Fa, until its relative humidity reaches 100% and temperature decreases to 17.5° C. Thereby gas flow Aa, in which a large amount of minute water particles float, is obtained, which gas flow Aa is passed through one flow passage 4a of the heat exchanger 3.

On the other hand, a gas flow B having a temperature 70.0° C., an absolute humidity of 14.4 g/kg and a relative humidity of 7% is sent into an inlet 5a of the heat exchanger 3 by the fan Fb at an air speed of 2 m/sec. The gas flow B becomes a low temperature gas flow Ba by sensible heat exchange in the heat exchanger.

Absolute humidity of the gas flow Ba is substantially same as that of the gas flow B. After passing through the heat exchanger, the gas flow Aa becomes a gas flow Ab at the outlet of the heat exchanger 3 and has a temperature of 30.0° C. and a relative humidity of about 100%. Gas flow Ab is exhausted into the outer air. The dehumidifier rotor 14 is rotated and operated at speed of 16 r.p.h. in the direction of the arrow in the drawing.

The refrigerated gas flow Ba mentioned above is sent into the adsorbing zone 16 of the dehumidifier rotor 14 to obtain a dry air flow HA having a temperature 55° C., an absolute humidity of 4.5 g/kg and a relative humidity of 5% by adsorbing/removing humidity. Operation of the dehumidifier rotor 14 is as explained in Example 5. Though dehumidification of high temperature air by an adsorption system (such as dehumidifier rotor 14) is extremely difficult, simple and effective dehumidification can be achieved if the high temperature air is first refrigerated with a heat exchanger as shown in this example.

EXAMPLE 8

The air flow HA obtained in Example 7 has a temperature of 55.0° C. and a relative humidity of 5%. Its temperature is too high and its relative humidity is too low for general air conditioning. Therefore the present example is to pass this air flow HA further through a second heat exchanger 3b to obtain supply air SA which has a temperature and humidity appropriate for air conditioning.

Figure 16:
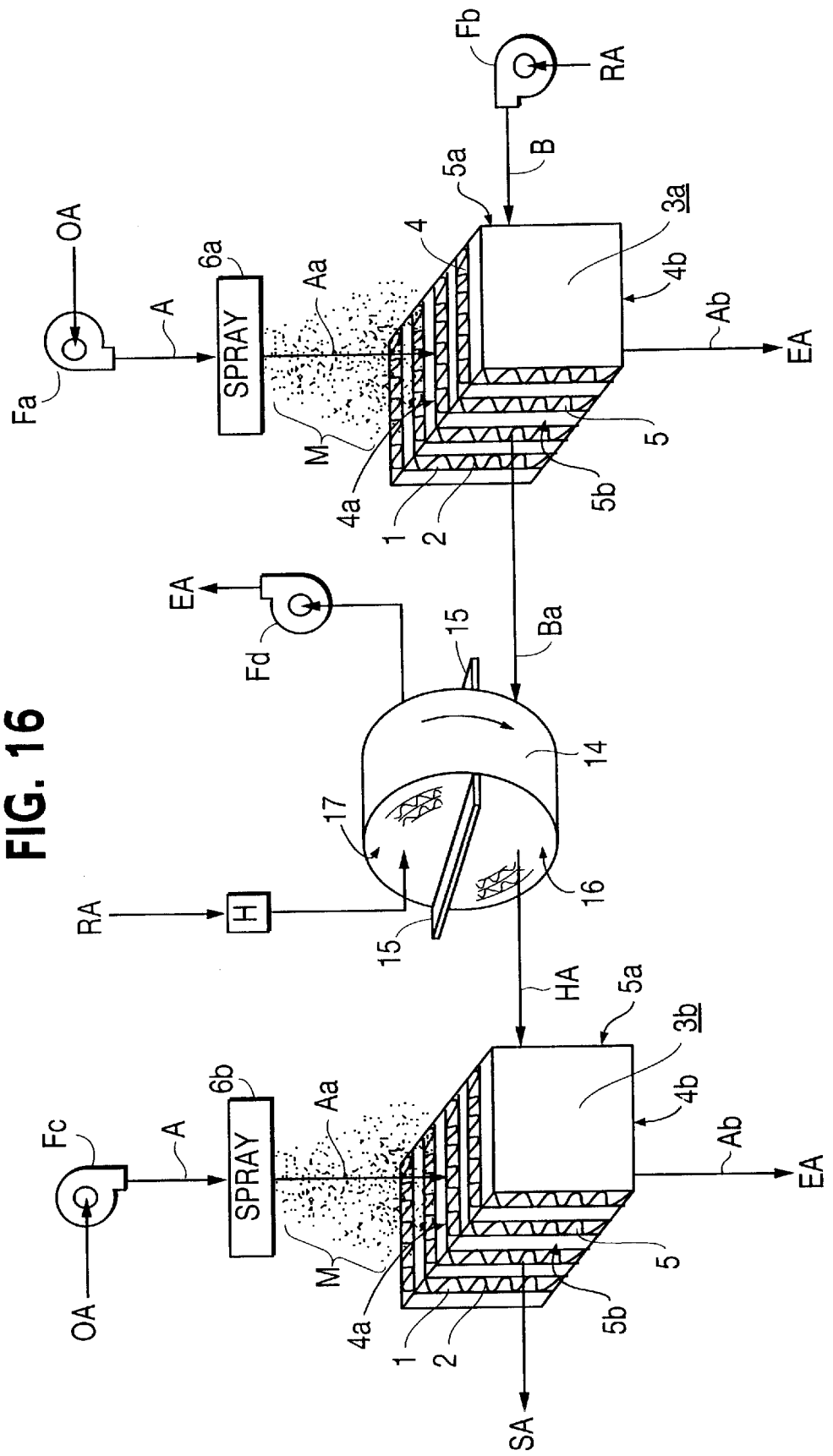
FIG. 16 is an explanatory drawing showing still another example of the method and the device for desiccative refrigeration of gas of the present invention.

As shown in FIG. 16, a high temperature gas flow B is passed through the cross-flow type heat exchanger 3a and the dehumidifier rotor 14 as in Example 7 to obtain an air flow HA. As the operation so far is utterly the same as in Example 7, repetition of explanation is omitted. The second cross-flow type heat exchanger 3b is installed downstream from the dehumidifier rotor 14, i.e., in the flow passage of the air flow HA flowing out of the dehumidifier rotor 14. A spraying device 6b is installed upstream from the small channels 4 of the second heat exchanger 3b as in Example 7 discussed above. The second heat exchanger 3b operates the same as the heat exchanger 3 of Example 7 discussed above. Therefore, an explanation thereof is omitted.

Dry air flow HA which passed through the adsorbing zone 16 of the dehumidifier rotor 14 is sent horizontally through a flow passage inlet 5a of small channels 5 of heat exchanger 3b. Heat exchanger 3b performs sensible heat exchange with a refrigerated gas flow Aa containing a large amount of minute water drops to obtain comfortable supply air SA having a temperature of 20.5° C., absolute humidity of 4.5 g/kg and a relative humidity of 30%. In regulating air conditions of supply air SA, the amount of water sprayed to the gas flow Aa is controlled to thereby regulate the temperature of supply air SA. When the humidity of supply air SA is too low, the reactivation temperature of the dehumidifier rotor can be lowered to decrease the dehumidifying efficiency of the dehumidifier rotor 14 and thereby increase the humidity of supply air SA.

In Examples 6–8 explained above, by spraying to the gas flow Aa a liquid having low boiling point such as ethanol, methyl acetate or methanol, instead of water, the temperature of the supply air flow SA can be further lowered.

Moreover, an ultrasonic mist-forming device can be used as spraying device 6 in every example. Other possibilities for the spraying device 6 include an air mist nozzle (discussed above) and fluid nozzle which does not use air. In the examples above, the relative humidity was increased to 100% and a large amount of minute water particles were made to float, both in a single step. It is also possible to install spraying devices 6 in a plurality of stages so that humidification to a relative humidity of 100% is performed as a first step with a first spraying device 6. Then, a large amount of minute water particles are made to float in a second step. Regardless of the method, it is essential to pass through the heat exchanger air whose relative humidity is 100% and in which a large amount of minute water particles (diameter of around 10 $\mu$m) float.

The heat exchanger shown and discussed for the above Examples was one formed by alternately laminating a corrugated sheet and a flat sheet. However, the heat exchanger of the present invention is not so restricted. All that is necessary is for the heat exchanger to have plural flow passages whose surface area is large, for example, a heat pipe provided at both ends with flow passages having many heat exchange fins is suitable.

EXAMPLE 9

Figure 17:
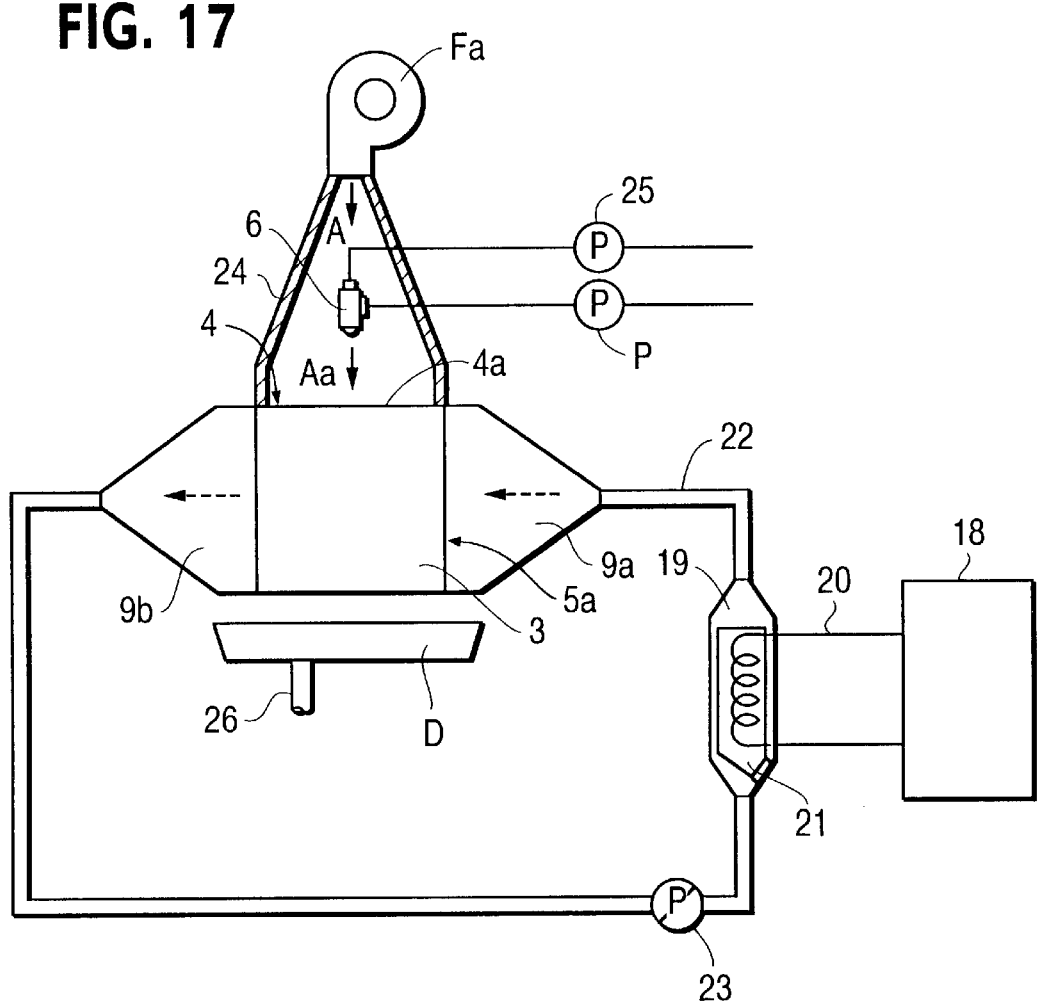
FIG. 17 is a vertical section of a device for refrigeration of water according to the present invention applied for refrigerator.

In FIG. 17, reference numeral 18 represents a known freezer having a compressor (not shown in the drawing), and reference numeral 19 is a heat exchanger, having a first flow passage 20 of which is a coiled tube and a second flow passage 21 which defines a jacket surrounding the first flow passage 20.

Hot Freon gas or other refrigerant from the compressor 18 flows in the first flow passage 20 of the heat exchanger 19 and cooling water flows in the second flow passage 21.

The second flow passage 21 of the heat exchanger 19 is connected to one flow passage of a cross-flow type heat exchanger 3 by a pipe 22 to which a circulating pump 23 is installed. That is to say, the heat exchanger 19 and the cross-flow type heat exchanger 3 are arranged so that cooling water circulates between them in an airtight condition with heat exchanger 3 removing heat introduced by heat exchanger 19. In the drawing, reference numerals 9a and 9b represent chambers for channeling water through heat exchanger 3.

Fan Fa forces air from the atmosphere through an upper end of a chamber 24. The lower end of the chamber 24 is connected to the flow inlet 4a of small channels 4 of the cross-flow type heat exchanger 3. The flow outlet of small channels 4 of heat exchanger 3 is open to the atmosphere.

A spraying device 6 is installed inside the chamber 24 to increase the relative humidity of the air in the chamber 24 to 100% and, at the same time, introduce a large amount of floating minute water drops, i.e., misty condition. As a spraying device 6, an air spraying nozzle, for example, may be used to which a pressurizing pump P for water and a compressor 25 for air are connected.

Water tank D is installed under the cross-flow type heat exchanger 3 and is provided with a drain pipe 26.

Figure 18:
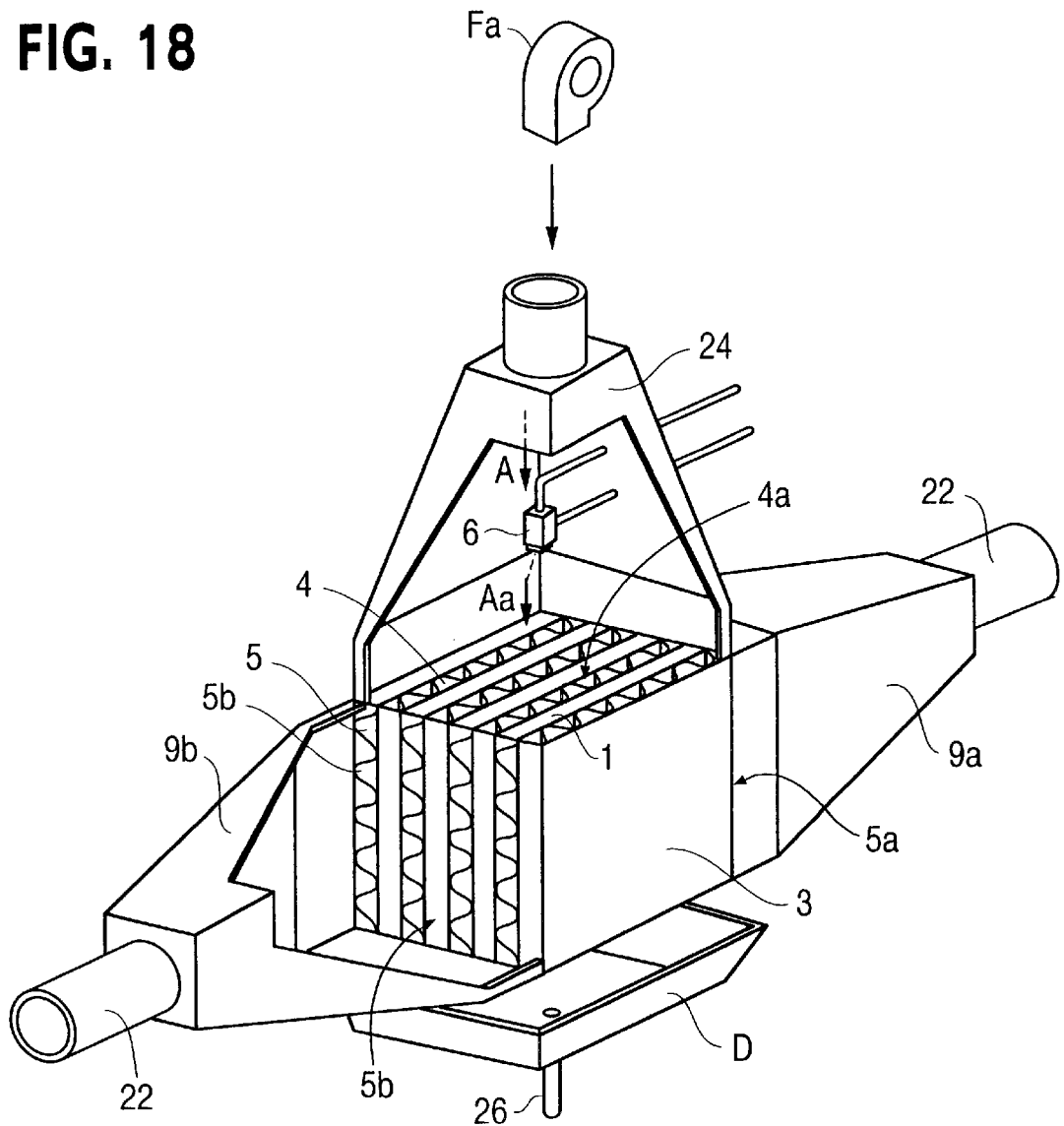
FIG. 18 is a perspective view of a device for refrigeration of water shown in FIG. 19, a portion being broken away for the purpose of illustration.

As shown in FIG. 18, the cross-flow type heat exchanger 3 is oriented so that the axis of small channels 4 is almost vertical and the axis of small channels 5 is almost horizontal. Chamber 24 is installed at a flow inlet 4a of the small channels 4 and is provided with a fan Fa and a spraying device 6. Chambers 9a and 9b are installed respectively at a flow inlet 5a and a flow outlet 5b of the small channels 5, and are connected to one another via pipe 22.

The operation of Example 9 will now be described. Fan Fa produces a gas flow A, to which water drops are sprayed by a spraying device 6 to achieve gas flow Aa. The quantity of water sprayed should be more than will be vaporized simply from spraying. Thus, only a portion of water drops sprayed will vaporize and remove the heat of vaporization to lower the temperature of gas flow Aa sent into the chamber 24. Therefore, the humidity of the air in the chamber 24, i.e., the gas flow Aa, is increased to 100% and a large amount of minute water particles are caused to float in the air, i.e., a misty condition is caused.

Then this gas flow Aa, in which a large amount of minute water drops float, is introduced into the small channels 4 of the cross-flow type heat exchanger 3. When freezer 18 is in operation, the high temperature refrigerant is sent into flow passage 20 of heat exchanger 19, cooled water is sent through the flow passage 21 of heat exchanger 19 such that heat exchange occurs between the high temperature refrigerant and the cooled water.

The water sent through flow passage 21 of heat exchanger 19 is circulated by pump 23 and is sent through small channels 5 of the cross-flow type heat exchanger 3 via pipe 22 and chamber 9a. Sensible heat exchange occurs between small channels 4 and small channels 5 through separating wall 1. That is to say, the cooling water that passes through small channels 5 is cooled by the gas flow Aa which passes through small channels 4 and, at the same time, the gas flow Aa which passes through small channels 4 is heated.

Because of the heating, the relative humidity of the gas flow Aa decreases below 100% and the large amount of minute water particles contained therein vaporize, with the heat of vaporization of cooling gas flow Aa.

In this process, the temperature of gas flow Aa passing through small channels 4 remains substantially constant at the low initial temperature. Therefore, the cooling water which passes through small channels 5 is cooled continuously over the full length (horizontal direction) of small channels 5 of heat exchanger 3, and its temperature is kept almost constant in the vertical direction.

In this case, when too much water is sprayed from spraying device 6, minute water drops gather on the separating wall in the small channels 4 of the cross-flow type heat exchanger 3 and cohere, forming large water drops and water currents which have much smaller surface areas compared with minute water drops. With the smaller surface area, the temperature of the gas flow Aa cannot be fully lowered, and the device including heat exchangers 3 and 19 cannot fully lower the temperature of the refrigerant. When the amount of minute water drop sprayed is just a little more than the minimum necessary and the drops are sprayed uniformly, cooling efficiency is high and water is conserved.

Water drops which did not vaporize in the small channels 4 of the cross-flow type heat exchanger 3 are pooled in the water tank D and are discharged from the drain pipe 26. As mentioned above, the quantity of water sprayed from the water spray is almost the same as the quantity of water vaporized in the small channels 4 of the cross-flow type heat exchanger 3. Therefore, there is not much water collected in water tank D, and there is no problem if all of it is thrown away. Thus, water sprayed from the water spray is not circulated and there is no possibility of algae growing.

In the examples mentioned above, water was described as the liquid to be cooled in heat exchanger 3 and heated in heat exchanger 19. It is also possible to add to the water an antifreeze agent, such as ethylene glycol, to about 50 vol. % to avoid freezing in winter. It is further possible to add an anticorrosive in order to prevent corrosion of the heat exchanger 19 and the cross-flow type heat exchanger 3.

EXAMPLE 10

Figure 19:
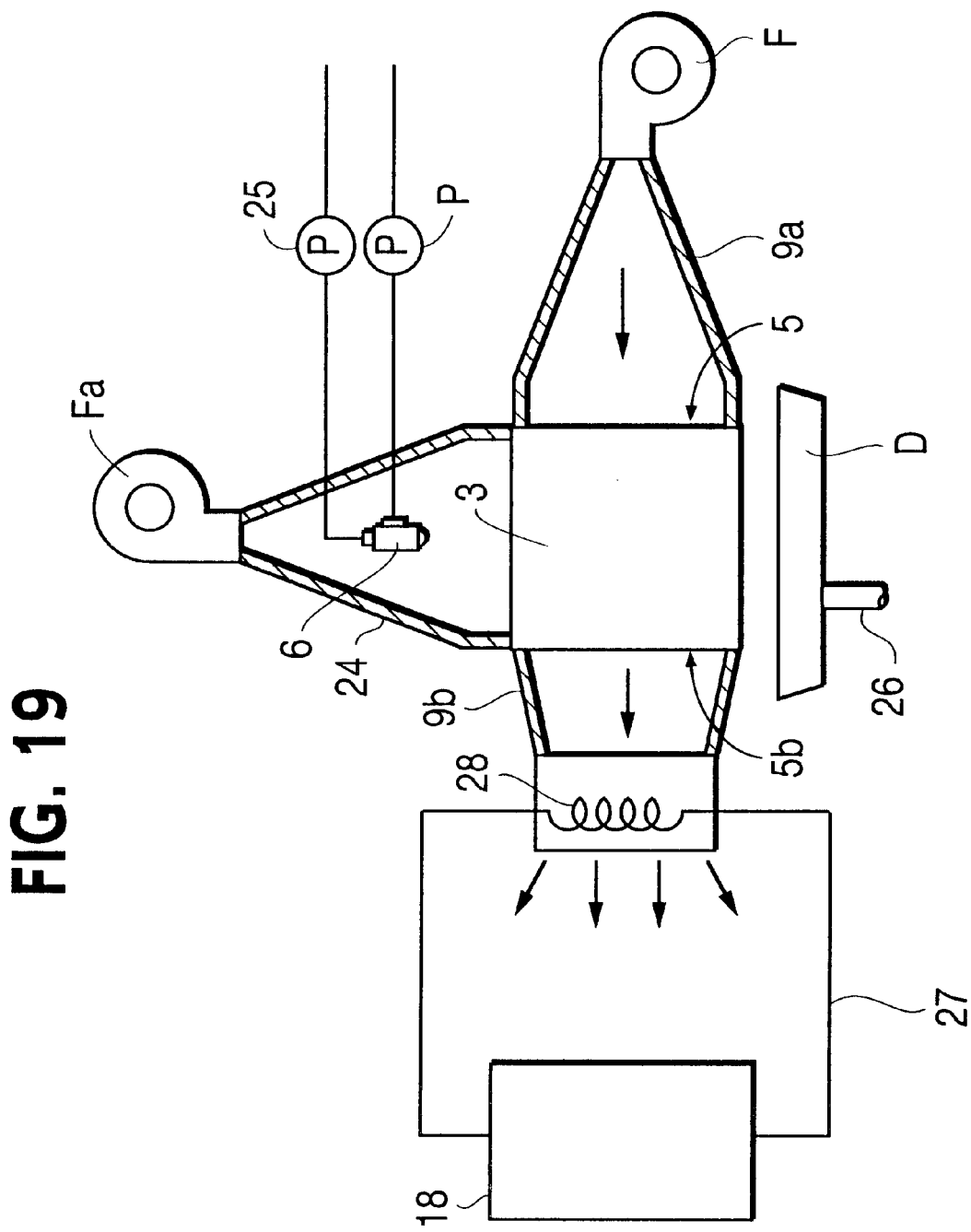
FIG. 19 is a vertical section of a device for refrigeration of air according to the present invention applied for refrigerator.

FIG. 19 shows another example of a refrigerating device for a freezer according to the invention. The differences between the examples shown in FIGS. 19 and 21 are as follows: In Example 9 shown in FIG. 17, water or possibly another liquid is passed through the small channels 5 of the cross-flow type heat exchanger 3. In this example (FIG. 19), an air flow from a fan F is passed through the small channels 5 of the cross-flow type heat exchanger 3.

That is to say, fan F is a blower connected to the inlet of the chamber 9a. The outlet of the chamber 9a is connected to the inlet 5a of small channels 5 of cross-flow type heat exchanger 3. The outlet 5b of small channels 5 is connected to the inlet of the chamber 9b, and the outlet of chamber 9b is connected to a radiator 28.

A pipe 27 is installed so that refrigerant from the freezer 18 is passed through the radiator 28. This configuration (freezer 18, pipe 27 and radiator 28) is the same as that of Example 9 (FIG. 17). Therefore, an explanation thereof is omitted.

In this example, air passes through the small channels 5 of the cross-flow type heat exchanger 3 under the force of fan F, and is cooled in doing so. The cooled air is directed onto the radiator 28. Hot refrigerant from the freezer 18 is sent into the radiator 28 through the pipe 27 to emit heat to the cooled air from small channels 5 which air is directed onto radiator 28.

In other words, the radiator 28 is cooled by the air flow cooled while passing through small channels 5 of the cross-flow type heat exchanger 3. The heat exchange efficiency of radiator 28 is much better than if radiator 28 were cooled by outer air.

As to possible operating conditions of this Example, a cross-flow type heat exchanger 3 constructed the same as that of Example 9 (shown in FIG. 17 above) was used. Air was passed through the small channels 4 of cross-flow type heat exchanger 3 by fan Fa at a velocity of 2 m/sec. when outer air (blown through fans F and Fa) had a temperature of 35° C. and a relative humidity of 39%. Twelve liters/hour of water were sprayed into the air entering small channels 4 by the spraying device 6. The temperature of the air that goes from the cross-flow type heat exchanger 3 to the radiator 28 was 18.6° C. and the cooling effect of the refrigerant became extremely high.

In this example, a refrigerating device having heat exchanger 3 of the present invention can be installed to blow cool air on a radiator of a freezer or an air conditioning device already installed, and the efficiency of the freezer or air conditioning device already installed can be increased through a simple process.

The present invention is constructed as explained above, and its principle is to pass a gas flow Aa, having 100% relative humidity and in which a large amount of minute water drops float uniformly, through one flow passage of a heat exchanger having plural fluid flow passages, and to pass a gas flow B to be refrigerated, such as air or water, through the other flow passage. The gas flow Aa with minute water drops floating therein and the gas flow B contact opposite sides of a partition wall between them. The gas flow Aa is heated, the relative humidity is decreased and the minute water drops are evaporated. The heat of vaporization of the minute water drops refrigerates gas flow Aa and thereby gas flow B. The present invention regulates the refrigeration level of gas flow B by controlling the amount of water sprayed by spraying device 6. By increasing the amount of water sprayed as the temperature difference between the gas flow Aa and the high temperature gas flow B increases, the ability of gas flow Aa to refrigerate increases so that high temperature gas flow B can be regulated to a substantially constant temperature. Furthermore, dry refrigerated air can be easily obtained by combining the refrigeration device and a dehumidifier.

As explained in Example 1, a cross-flow type heat exchanger 3 is provided with a spraying device 6. By using gas flow Aa in which a large amount of minute water drops float, high temperature gas flow B was refrigerated with an extremely high sensible heat exchange efficiency, about 97%~100%. As shown as in the contrasting example of Example 1, when the cross-flow type heat exchanger of Example 1 is used without a water spray or similar humidifier, sensible heat exchange efficiency was 63%. From this, it can be seen that heat exchange efficiency in the present invention when adding water or other fluid is extremely high.

The energy consumption necessary for this heat exchange method and device is about 250 W (the operating energy of a fan). The heat energy needed for refrigeration of gas flow B, on the contrary, is one and a half times to several ten times of the energy consumption, for example, and the energy consumption increases as temperature of the gas flow B elevates.

The refrigeration device of the invention can be used alone or with a dehumidifier as shown in Examples 6–8, and thus is suitable for use as an air-conditioning apparatus. The operation costs are extremely low as outlined above, and it is not necessary to recirculate room air. Desiccative air-cooling can continuously supply to the room fresh outer air which has been cooled. Therefore, it is possible to avoid an injurious buildup of gases such as carbon dioxide in room air.

Furthermore, the invention does not raise environmental problems, as Freon gas is not used, contrary to prior air-cooling. The invention is excellent from a hygienic point of view in that there is no need to use a compressor and hot air from wasted heat will not generate bacteria or mold.

While the invention has been described in connection with preferred embodiments, it will be understood that modifications thereof within the principles outlined above will be evident to those skilled in the art. Thus, the invention is not limited to the preferred embodiments, but is intended to encompass such modifications.

What is claimed is:

1. A method for refrigerating a fluid, comprising the steps of:
   (a) adding a volatile liquid mist to a flow of a gas to saturate the cooling gas with vapor of the said volatile liquid, to cause a large amount of misty minute liquid drops of said volatile liquid to float in the gas and to form a cooling gas;
   (b) passing the cooling gas through first flow channels of a cross flow type heat exchanger having first and second flow channels, the first flow channels being non-porous and being separated from the second flow channels;
   (c) passing the fluid through the second flow channels of the heat exchanger, so that heat from the fluid is transferred to the cooling gas, while the cooling gas passes through the first flow channels of the heat exchanger to elevate the temperature of the cooling gas;
   (d) allowing a portion of the minute liquid drops floating in the cooling gas to vaporize in the heat exchanger due to the elevated temperature of the cooling gas;
   (e) continuously lowering the temperature of the cooling gas by the heat of vaporization of the minute liquid drops evaporated in step (d); and
   (f) continuously refrigerating the fluid through heat exchange with the cooling gas having a temperature continuously lowered in step (e).

2. A method for refrigerating a fluid according to claim 1, wherein:
   a temperature difference is evaluated between the cooling gas and the fluid before the cooling gas and the fluid are passed through the heat exchanger; and
   the amount of minute liquid drops caused to float in step (a) is changed according to corresponding to changes in the temperature difference between the cooling gas and the fluid.

3. A method for refrigeration of fluid according to claim 1, wherein:
   a temperature difference is evaluated between the cooling gas and the fluid before the cooling gas and the fluid are passed through the heat exchanger;
   the cooling gas is passed through the heat exchanger at a flow velocity; and
   the flow velocity at which the cooling gas flow is passed through the heat exchanger is changed corresponding to changes in the temperature difference between the cooling gas and the fluid.

4. A method for refrigerating a fluid according to claim 1, wherein step (a) comprises the substeps of:
   (a1) adding the volatile liquid to saturate the cooling gas; and
   (a2) after step (a1), adding the volatile liquid to cause a large amount of misty minute liquid drops to flow in the cooling gas.

5. A method for refrigerating a fluid according to claim 1, wherein:
   the cooling gas enters and leaves the first flow channels of the heat exchanger respectively through an inlet and an outlet of the first flow channels; and
   the cooling gas is recirculated such that the volatile liquid mist is added to the cooling gas after the cooling gas exits the outlet and before the cooling gas reenters the inlet.

6. A method for refrigerating a fluid according to claim 1, wherein the volatile liquid is selected from the group consisting of water, a volatile organic liquid and a mixture of water and a volatile organic liquid.

7. A method for refrigerating a fluid according to claim 1, wherein the volatile liquid is added in step (a) by spraying the volatile liquid in a stream of air from a gas/liquid mixing nozzle.

8. A method of refrigerating a fluid according to claim 1, wherein the diameter of misty minute liquid drops is not more than 280 $\mu$m.

9. A method for refrigerating a fluid, according to claim 1, further comprising the step of dehumidifying the fluid before passing the fluid through the second flow channels of the heat exchanger.

10. A method for refrigerating a fluid, according to claim 1, further comprising the step of dehumidifying the fluid after the fluid passes through the second flow channels of the heat exchanger.

11. A method for refrigerating a fluid, comprising the steps of:
   (a) adding a volatile liquid mist to a flow of a gas to saturate the gas with vapor of the said volatile liquid, to cause a large amount of misty minute liquid drops of said volatile liquid to float in the gas and to form a cooling gas;
   (b) passing the cooling gas through a first flow channels of a cross flow type first heat exchanger having first and second flow channels, the first flow channels being non-porous and being separated from the second flow channels;
   (c) passing the fluid through the second flow channels of the first heat exchanger, so that heat from the fluid is transferred to the cooling gas, while the cooling gas passes through the first flow channels of the first heat exchanger to elevate temperature of the cooling gas and vaporize a portion of the minute liquid drops floating in the cooling gas;
   (d) allowing a portion of the minute liquid drops floating in the cooling gas to vaporize in the heat exchanger due to the elevated temperature of the cooling gas;
   (e) dehumidifying the fluid after the fluid passes through the first heat exchanger;

(f) passing the cooling gas through first flow channels of a second heat exchanger having first and second flow channels;

(g) passing the fluid dehumidified in step (d) through the second flow channels of the second heat exchanger, so that heat from the fluid is transferred to the cooling gas, while the cooling gas passes through the first flow channels of the second heat exchanger to elevate temperature of the cooling gas and vaporize a portion of the minute liquid drops floating in the cooling gas.

12. A device for refrigerating a fluid, comprising:

mist-forming means for adding a liquid mist of a volatile liquid to a flow of gas to saturate the gas with volatile liquid vapor, to cause a large amount of misty minute liquid drops to float in the gas and to form a cooling gas;

a cross flow type heat exchanger having first and second flow channels, the first flow channels being non-porous and being separated from the second flow channels;

means for directing the cooling gas through the first flow channels of the heat exchanger so that a portion of the minute liquid drops floating in the cooling gas is allowed to vaporize in the heat exchanger due to elevated temperature of the cooling gas; and means for directing the fluid through the second flow channels of the heat exchanger.

13. A device for refrigerating a fluid according to claim 12, further comprising means for introducing a volatile liquid vapor provided upstream from the mist-forming means such that the gas flows from the means for introducing a volatile liquid vapor, and flows to the mist forming means.

14. A device for refrigerating a fluid according to claim 12, further comprising:

ductwork for directing the cooling gas from an outlet of the first flow channels of the heat exchanger to an inlet of the first flow channels of the heat exchanger; and a fan provided in the ductwork and directed toward the inlet of the first flow channels of the heat exchanger.

15. A device for refrigerating a fluid according to claim 12, wherein the heat exchanger is selected from the group consisting of a heat exchanger in which the first and second flow channels extend generally perpendicular to one another, a heat exchanger in which the first and second flow channels extend diagonal to one another, a heat exchanger in which the first and second flow channels extend generally parallel to one another, a combination heat exchanger in which the first and second flow channels extend generally perpendicular to one another toward inlets and outlets of the flow channels but extend generally parallel to one another toward middle portions of the flow channels, the combination heat exchanger having alternating layers of flat sheets and corrugated sheets laminated together.

16. A device for refrigerating a fluid according to claim 12, wherein the heat exchanger is selected from the group consisting of a heat exchanger in which the first and second flow channels extend generally perpendicular to one another, a heat exchanger in which the first and second flow channels extend diagonal to one another, a heat exchanger in which the first and second flow channels extend generally parallel to one another, a combination heat exchanger in which the first and second flow channels extend generally perpendicular to one another toward inlets and outlets of the flow channels but extend generally parallel to one another toward middle portions of the flow channels, the combination heat exchanger having alternating layers of flat sheets and spacers laminated together, the spacers extending the direction of the flow channels.

17. A device for refrigerating a fluid according to claim 12, wherein heat exchanger has a surface which is hydrophilic.

18. A device for refrigerating a fluid according to claim 12, wherein the heat exchanger has walls extending between the first and second flow channels, and minute particles are rigidly adhered onto the walls of the heat exchanger.

19. A device for refrigerating a fluid according to claim 18, wherein the minute particles are of adsorbent.

20. A device for refrigerating a fluid according to claim 12, further comprising dehumidifying means provided on an upstream side of the second flow channels of the heat exchanger for dehumidifying the fluid before the fluid is directed through the second flow channels of the heat exchanger.

21. A device for refrigerating a fluid according to claim 12, further comprising dehumidifying means provided on a downstream side of the second flow channels of the heat exchanger for dehumidifying the fluid after the fluid is directed through the second flow channels of the heat exchanger.

22. A device for refrigerating a fluid according to claim 12, comprising:

mist forming means for adding a liquid mist of a volatile liquid to a flow of gas to saturate the gas with liquid vapor, to cause a large amount of misty minute liquid drops to float in the gas and to form a cooling gas;

first and second heat exchangers respectively having first and second flow channels;

means for directing the cooling gas through the first flow channels of the first and second heat exchangers;

means for directing the fluid through the second flow channels of the first heat exchanger;

a dehumidifier provided on a downstream side of the second flow channels of the first heat exchanger and on an upstream side of the second flow channels of the second heat exchangers;

means for directing the fluid from the second flow channels of the first heat exchanger to the dehumidifier; and means for directing the fluid from the dehumidifier to the second flow channels of the second heat exchanger.

23. A device for refrigerating a fluid according to claim 22, further comprising means for introducing a volatile liquid vapor provided upstream from the mist-forming means such that the gas flows from the means for introducing a volatile liquid vapor, and flows to the mist forming means.

24. A device for refrigerating a fluid according to claim 22, further comprising:

ductwork for directing the cooling gas from an outlet of the first flow channels of the heat exchanger to an inlet of the first flow channels of the heat exchanger; and a fan provided in the ductwork and directed toward the inlet of the first flow channels of the heat exchanger.

25. A device for refrigerating a fluid according to claim 22, wherein the heat exchanger is selected from the group consisting of a heat exchanger in which the first and second flow channels extend generally perpendicular to one another, a heat exchanger in which the first and second flow channels extend diagonal to one another, a heat exchanger in which the first and second flow channels extend generally parallel to one another, a combination heat exchanger in which the first and second flow channels extend generally perpendicular to one another toward inlets and outlets of the flow channels but extend generally parallel to one another toward middle portions of the flow channels, the combination heat exchanger having alternating layers of flat sheets and corrugated sheets laminated together.

26. A device for refrigerating a fluid according to claim 22, wherein the heat exchanger is selected from the group consisting of a heat exchanger in which the first and second flow channels extend generally perpendicular to one another, a heat exchanger in which the first and second flow channels extend diagonal to one another, a heat exchanger in which the first and second flow channels extend generally parallel to one another, a combination heat exchanger in which the first and second flow channels extend generally perpendicular to one another toward inlets and outlets of the flow channels but extend generally parallel to one another toward middle portions of the flow channels, the combination heat exchanger having alternating layers of flat sheets and spacers laminated together, the spacers extending the direction of the flow channels.

27. A device for refrigerating a fluid to cool a radiator, comprising:
   mist forming means for adding a liquid mist of a volatile liquid to a flow of gas to saturate the gas with volatile liquid vapor, to cause a large amount of misty minute liquid drops to float in the gas and to form a foggy gas stream;
   a cross flow type first heat exchanger having first and second groups of channels, the first flow channels being non-porous and being separated from the second flow channels;
   means for directing the foggy gas stream through the first group of channels of the first heat exchanger so that a portion of the misty minute liquid drops floating in the foggy gas stream is allowed to vaporize in the first heat exchanger due to elevated temperature of the cooling gas;
   means for directing the fluid through the second group of channels of the first heat exchanger;
   a second cross flow type heat exchanger connected to the radiator and provided downstream from the second group of channels of the first heat exchanger for exchanging heat between the fluid directed through the first heat exchanger and the radiator.

28. A device for refrigerating a heated fluid to cool a radiator according to claim 27, wherein the fluid is selected from the group consisting of water and a liquid mixture containing water.

29. A device for refrigerating a fluid to cool a radiator according to claim 27, wherein the fluid is a gas.

30. A method for refrigerating a fluid according to claim 1, further comprising the steps of:
   providing aluminum sheets;
   soaking the aluminum sheets in a solution selected from the group consisting of an aqueous solution of sodium phosphate, sodium hypochlorite, chromic acid, phosphoric acid, oxalix acid, caustic soda and boiling water;
   forming the heat exchanger having first and second flow channels from the aluminum sheets soaked in the solution.

31. A device for refrigerating a fluid according to claim 12, wherein the heat exchanger is formed of metal sheets having concave and convex surface portions.

32. A method for refrigerating a fluid, comprising the steps of:
   (a) adding a volatile liquid mist to a flow of a gas to saturate the cooling gas with vapor of the said volatile liquid, to cause a large amount of misty minute liquid drops of said volatile liquid to float in the gas and to form a cooling gas;
   (b) passing the cooling gas through first flow channels of a cross flow type heat exchanger having first and second flow channels such that the minute liquid drops are entrained across an entire cross section of the first flow channels, the first flow channels being separated from the second flow channels;
   (c) passing the fluid through the second flow channels of the heat exchanger, so that heat from the fluid is transferred to the cooling gas, while the cooling gas passes through the first flow channels of the heat exchanger to elevate the temperature of the cooling gas;
   (d) allowing a portion of the minute liquid drops floating in the cooling gas to vaporize in the heat exchanger due to the elevated temperature of the cooling gas;
   (e) continuously lowering the temperature of the cooling gas by the heat of vaporization of the minute liquid drops evaporated in step (d); and
   (f) continuously refrigerating the fluid through heat exchange with the cooling gas having a temperature continuously lowered in step (e).

33. A device for refrigerating a fluid, comprising:
   mist-forming means for adding a liquid mist of a volatile liquid to a flow of gas to saturate the gas with volatile liquid vapor, to cause a large amount of misty minute liquid drops to float in the gas and to form a cooling gas;
   a cross flow type heat exchanger having first and second flow channels, the first flow channels being separated from the second flow channels;
   means for directing the cooling gas through the first flow channels of the heat exchanger so that the minute liquid drops are entrained across an entire cross section of the first flow channels and so that a portion of the minute liquid drops floating in the cooling gas is allowed to vaporize in the heat exchanger due to elevated temperature of the cooling gas; and
   means for directing the fluid through the second flow channels of the heat exchanger.

34. A method for refrigerating a fluid, comprising the steps of:
   (a) adding a volatile liquid mist to a flow of a gas to saturate the cooling gas with vapor of the said volatile liquid, to cause a large amount of misty minute liquid drops of said volatile liquid to float in the gas and to form a cooling gas;
   (b) passing the cooling gas through first flow channels of a cross flow type heat exchanger having first and second flow channels, the first flow channels being separated from the second flow channels;
   (c) passing the fluid through the second flow channels of the heat exchanger, so that heat from the fluid is transferred to the cooling gas, while the cooling gas passes through the first flow channels of the heat exchanger to elevate the temperature of the cooling gas;
   (d) allowing a portion of the minute liquid drops floating in the cooling gas to vaporize in the heat exchanger due to the elevated temperature of the cooling gas;
   (e) continuously lowering the temperature of the cooling gas by the heat of vaporization of the minute liquid drops evaporated in step (d);
   (f) continuously refrigerating the fluid through heat exchange with the cooling gas having a temperature continuously lowered in step (e); and (g) allowing a portion of the minute liquid drops floating in the cooling gas to exit the first flow of channels after passing through the heat exchanger.

35. A device for refrigerating a fluid, comprising:

mist-forming means for adding a liquid mist of a volatile liquid to a flow of gas to saturate the gas with volatile liquid vapor, to cause a large amount of misty minute liquid drops to float in the gas and to form a cooling gas;

a cross flow type heat exchanger having first and second flow channels, the first flow channels being separated from the second flow channels;

means for directing the cooling gas through the first flow channels of the heat exchanger so that a portion of the minute liquid drops floating in the cooling gas is allowed to vaporize due to elevated temperature of the cooling gas and so that a portion of the minute liquid drops floating the cooling gas is allowed to exit the first flow of channels after passing through the heat exchanger; and means for directing the fluid through the second flow channels of the heat exchanger.

36. A device for refrigerating a fluid, comprising:

mist-forming means for adding a liquid mist of a volatile liquid to a flow of gas to saturate the gas with volatile liquid vapor, to cause a large amount of misty minute liquid drops to float in the gas and to form a cooling gas;

a cross flow type heat exchanger having first and second flow channels, the first flow channels being separated from the second flow channels, the first flow channels not having a water retention covering formed thereon;

means for directing the cooling gas through the first flow channels of the heat exchanger so that a portion of the minute liquid drops floating in the cooling gas is allowed to vaporize in the heat exchanger due to elevated temperature of the cooling gas; and means for directing the fluid through the second flow channels of the heat exchanger.

* * * * *